(12) United States Patent
Allen

(10) Patent No.: US 6,777,126 B1
(45) Date of Patent: Aug. 17, 2004

(54) FUEL CELL BIPOLAR SEPARATOR PLATE AND CURRENT COLLECTOR ASSEMBLY AND METHOD OF MANUFACTURE

(75) Inventor: Jeffrey P. Allen, Naugatuck, CT (US)

(73) Assignee: GenCell Corporation, Southbury, CT (US)

( * ) Notice: Subject to any disclaimer, the term of this patent is extended or adjusted under 35 U.S.C. 154(b) by 385 days.

(21) Appl. No.: 09/714,526

(22) Filed: Nov. 16, 2000

Related U.S. Application Data

(60) Provisional application No. 60/165,712, filed on Nov. 16, 1999, provisional application No. 60/187,526, filed on Mar. 7, 2000, and provisional application No. 60/242,760, filed on Oct. 24, 2000.

(51) Int. Cl.[7] ............................................. H01M 8/02
(52) U.S. Cl. .............................. 429/34; 429/35; 429/36; 429/38; 429/39; 429/26
(58) Field of Search ............................. 429/34, 35, 36, 429/37, 38, 39, 26

(56) References Cited

U.S. PATENT DOCUMENTS

| | | | |
|---|---|---|---|
| 4,169,917 A | 10/1979 | Baker et al. .................. | 429/26 |
| 4,175,165 A | 11/1979 | Adlhart ........................ | 429/30 |
| 4,476,197 A | 10/1984 | Herceg ......................... | 429/32 |
| 4,510,212 A | 4/1985 | Fraioli .......................... | 429/30 |
| 4,548,876 A | 10/1985 | Bregoli ......................... | 429/38 |
| 4,604,331 A | 8/1986 | Louis ........................... | 429/35 |
| 4,631,239 A | 12/1986 | Spurrier et al. ............... | 429/39 |
| 4,702,973 A | 10/1987 | Marianowski ............... | 429/41 |
| 4,753,857 A | 6/1988 | Hosaka ........................ | 429/38 |
| 4,781,996 A | 11/1988 | Toriya et al. ................. | 429/36 |
| 4,853,301 A | 8/1989 | Granata, Jr. et al. .......... | 429/39 |
| 4,857,420 A | 8/1989 | Maricle et al. ................ | 429/30 |
| 4,977,041 A | 12/1990 | Shiozawa et al. ............. | 429/26 |
| 4,978,589 A | 12/1990 | Shiozawa et al. ............. | 429/26 |
| 4,983,472 A | 1/1991 | Katz et al. .................... | 429/38 |
| 5,084,364 A | 1/1992 | Quaadvliet ................... | 429/34 |
| 5,227,256 A | 7/1993 | Marianowski et al. ........ | 429/16 |

(List continued on next page.)

FOREIGN PATENT DOCUMENTS

| | | | |
|---|---|---|---|
| DE | 4206490 | 9/1993 | |
| DE | 19821767 A1 * | 11/1999 | ............ H01M/8/00 |
| EP | 0 0007 078 | 1/1980 | |
| JP | 61024158 | 2/1986 | |
| JP | 2002100381 A * | 4/2002 | ............ H01M/8/02 |
| WO | WO 98/21773 | 5/1998 | |

OTHER PUBLICATIONS

Toshihiko, "Flat Solid Electrolyte Fuel Cell," abstract of Patent No. 07022038, *Patent Abstract of Japan* (1995).

*Primary Examiner*—Gregg Cantelmo
(74) *Attorney, Agent, or Firm*—Banner & Witcoff, Ltd.

(57) ABSTRACT

A fuel cell bipolar separator plate of variable length is formed from a sheet having a fixed width. The sheet is passed through a tool a predetermined distance and a pattern of ribs is formed on a central portion of the sheet with the tool to define a segment along the length of the sheet. The ribs define a fuel flow path on a first side of the sheet and an oxidant flow path on an opposed second side of the sheet. The sheet is passed through a tool a predetermined distance and the steps of forming the pattern on the sheet and passing the sheet through the tool are repeated until the sheet possesses a desired length, at which point the sheet is cut to a desired length.

91 Claims, 21 Drawing Sheets

U.S. PATENT DOCUMENTS

| | | | |
|---|---|---|---|
| 5,298,342 A | 3/1994 | Laurens et al. | 429/35 |
| 5,362,578 A | 11/1994 | Petri et al. | 429/35 |
| 5,424,144 A | 6/1995 | Woods, Jr. | 429/35 |
| 5,460,897 A | 10/1995 | Gibson et al. | 429/39 |
| 5,482,792 A | 1/1996 | Faita et al. | 429/30 |
| 5,503,945 A | 4/1996 | Petri et al. | 429/35 |
| 5,527,363 A | 6/1996 | Wilkinson et al. | 29/623.1 |
| 5,558,955 A | 9/1996 | Breault et al. | 429/38 |
| 5,707,755 A | 1/1998 | Grot | 429/40 |
| 5,726,105 A | 3/1998 | Grasso et al. | 442/326 |
| 5,733,682 A | 3/1998 | Quadakkers et al. | 429/210 |
| 5,770,327 A | 6/1998 | Barnett et al. | 429/32 |
| 5,773,160 A | 6/1998 | Wilkinson et al. | 429/13 |
| 5,773,161 A | 6/1998 | Farooque et al. | 429/34 |
| 5,776,624 A | 7/1998 | Neutzler | 429/26 |
| 5,795,665 A | 8/1998 | Allen | 429/12 |
| 5,798,187 A | 8/1998 | Wilson et al. | 429/26 |
| 5,798,188 A | 8/1998 | Mukohyama et al. | 429/34 |
| 5,811,202 A | 9/1998 | Petraglia | 429/35 |
| 5,833,822 A | 11/1998 | Hsu | 204/270 |
| 5,846,668 A | 12/1998 | Watanabe | 429/32 |
| 5,858,567 A | 1/1999 | Spear, Jr. et al. | 429/12 |
| 5,922,485 A | 7/1999 | Enami | 429/26 |
| 5,942,349 A | 8/1999 | Badwal et al. | 429/34 |
| 6,033,794 A | 3/2000 | George et al. | 429/24 |
| 6,037,073 A | 3/2000 | Besmann et al. | 429/34 |
| 6,040,073 A | 3/2000 | Okamoto | 429/26 |
| 6,040,075 A | 3/2000 | Adcock et al. | 429/32 |
| 6,040,076 A | 3/2000 | Reeder | 429/35 |
| 6,045,934 A | 4/2000 | Enami | 429/30 |
| 6,045,935 A | 4/2000 | Ketcham et al. | 429/30 |
| 6,048,633 A | 4/2000 | Fujii et al. | 429/32 |
| 6,048,634 A | 4/2000 | Kaufman et al. | 429/34 |
| 6,048,636 A | 4/2000 | Naoumidis et al. | 429/44 |
| 6,050,331 A | 4/2000 | Breault et al. | 165/168 |
| 6,051,330 A | 4/2000 | Fasano et al. | 429/30 |
| 6,051,331 A | 4/2000 | Spear, Jr. et al. | 429/34 |
| 6,054,228 A | 4/2000 | Cisar et al. | 429/18 |
| 6,054,231 A | 4/2000 | Virkar et al. | 429/34 |
| 6,071,635 A | 6/2000 | Carlstrom, Jr. | 429/34 |
| 6,071,636 A | 6/2000 | Mosdale | 429/34 |
| 6,074,692 A | 6/2000 | Hulett | 427/115 |
| 6,080,502 A | 6/2000 | Nölscher et al. | 429/34 |
| 6,096,450 A | 8/2000 | Walsh | 429/34 |
| 6,099,984 A | 8/2000 | Rock | 429/39 |
| 6,103,415 A | 8/2000 | Kurita et al. | 429/34 |
| 6,117,580 A | 9/2000 | Nitschk″et al. | 429/34 |
| 6,261,710 B1 | 7/2001 | Marianowski | 429/34 |

\* cited by examiner

VIEW J

VIEW HH

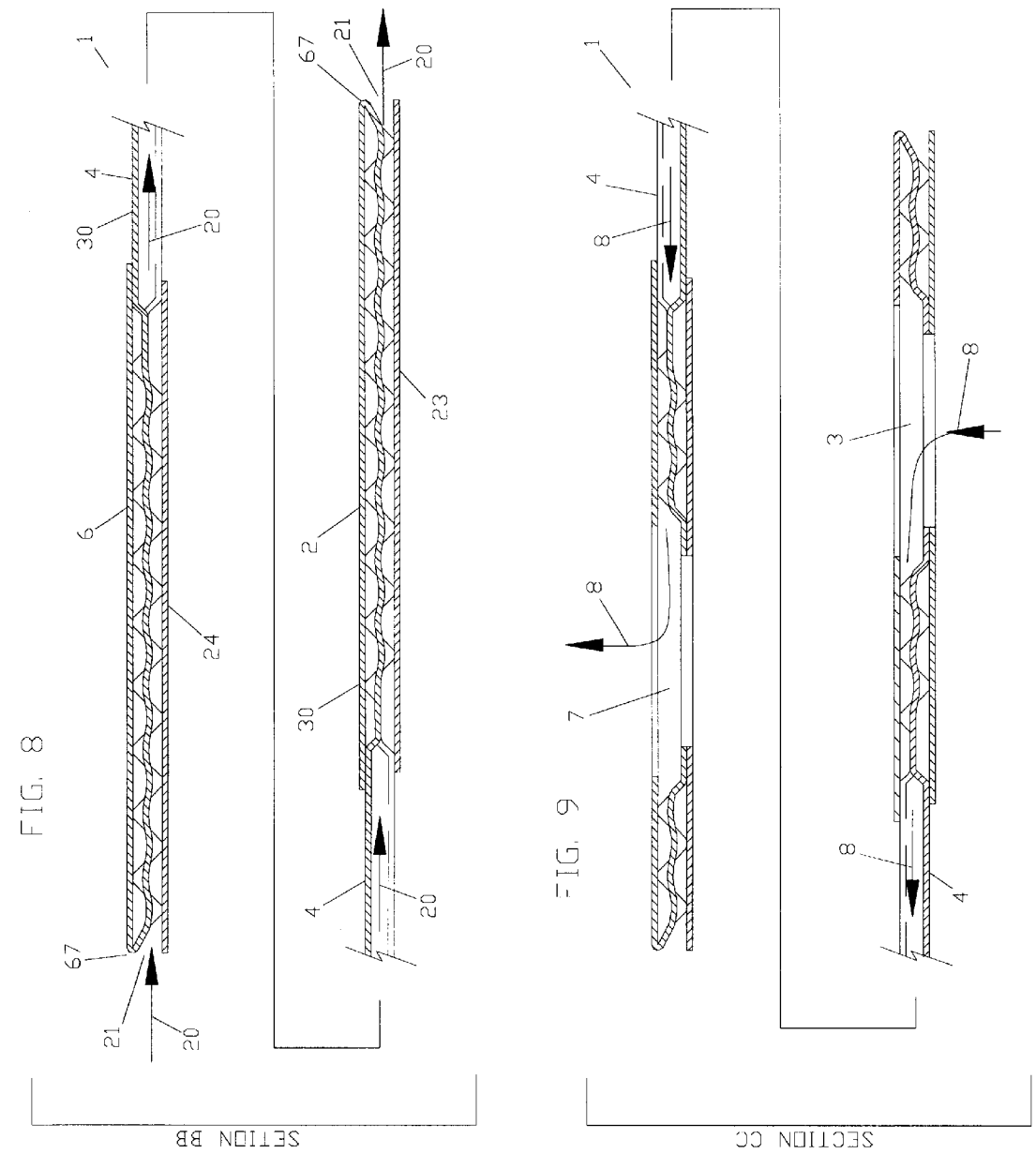

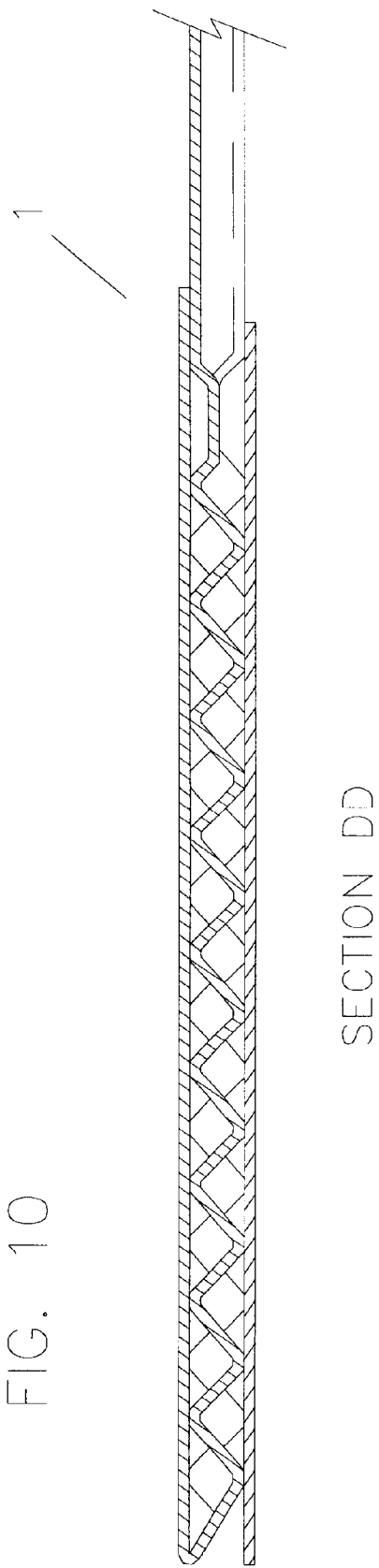

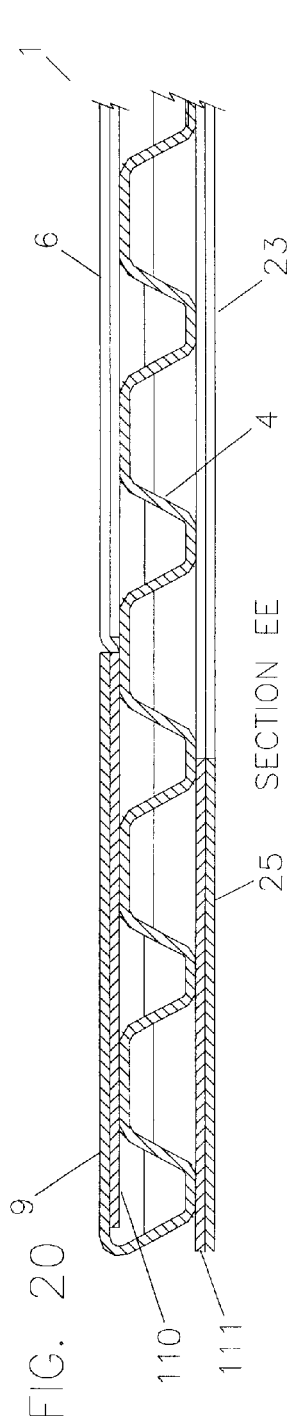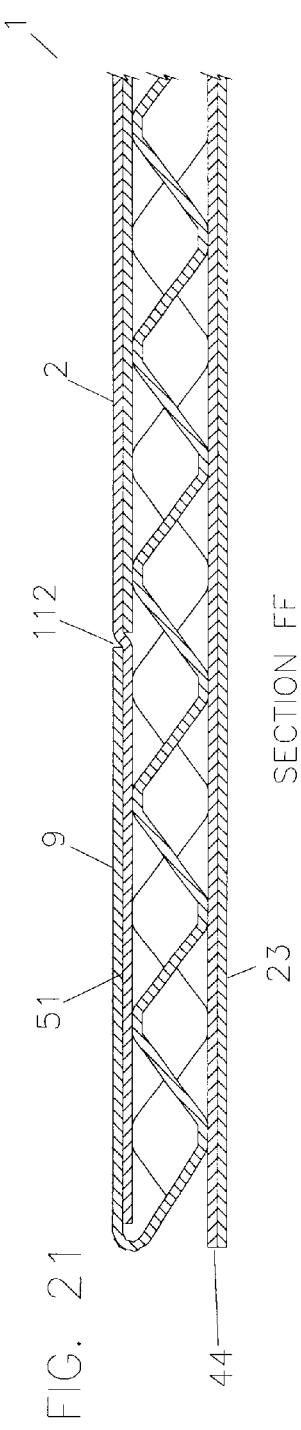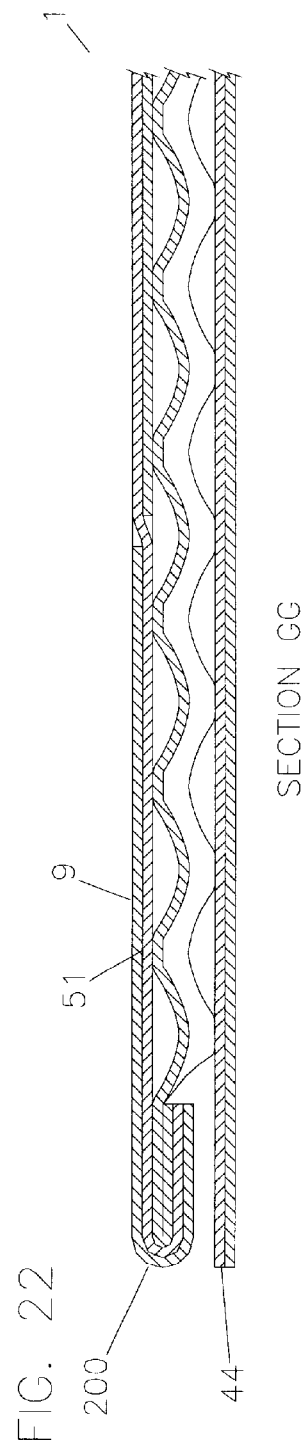

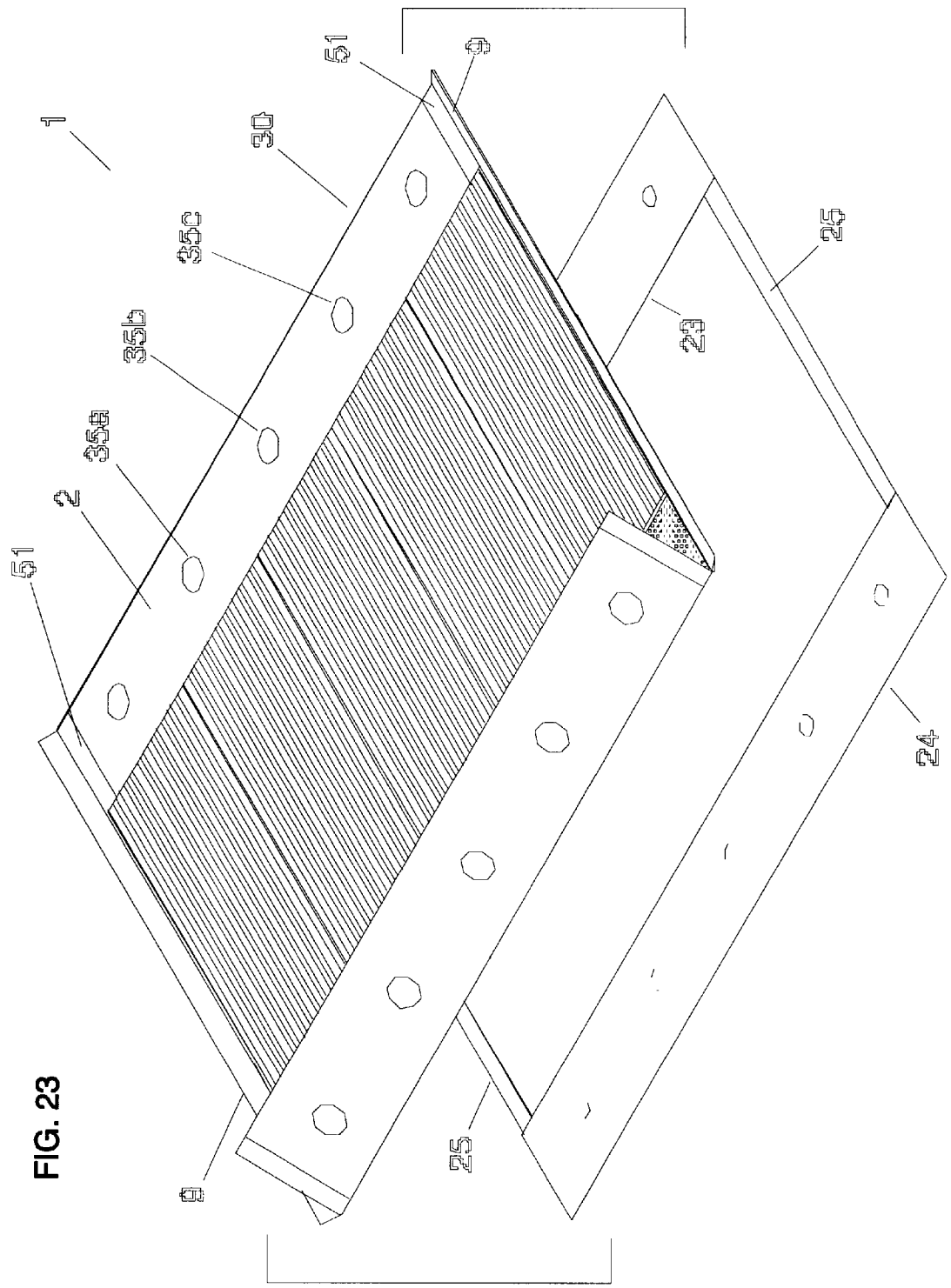

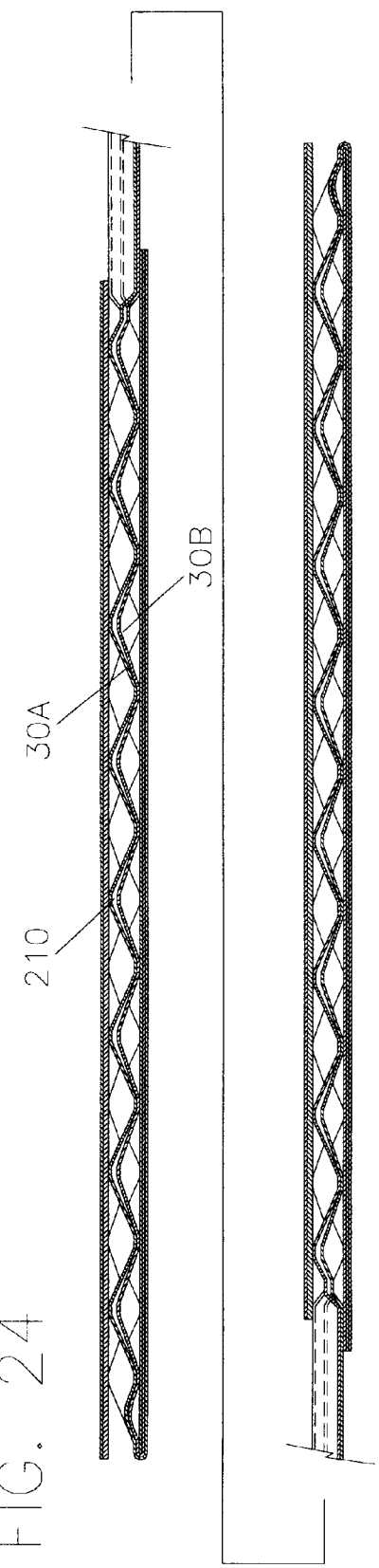
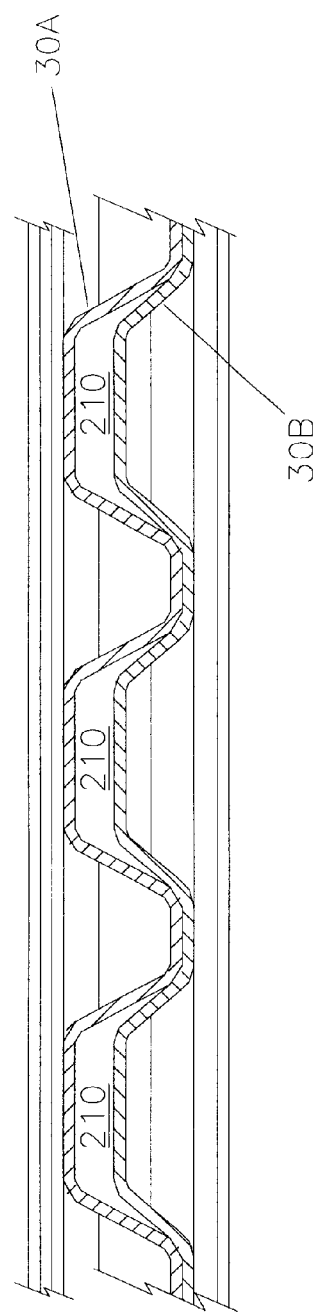

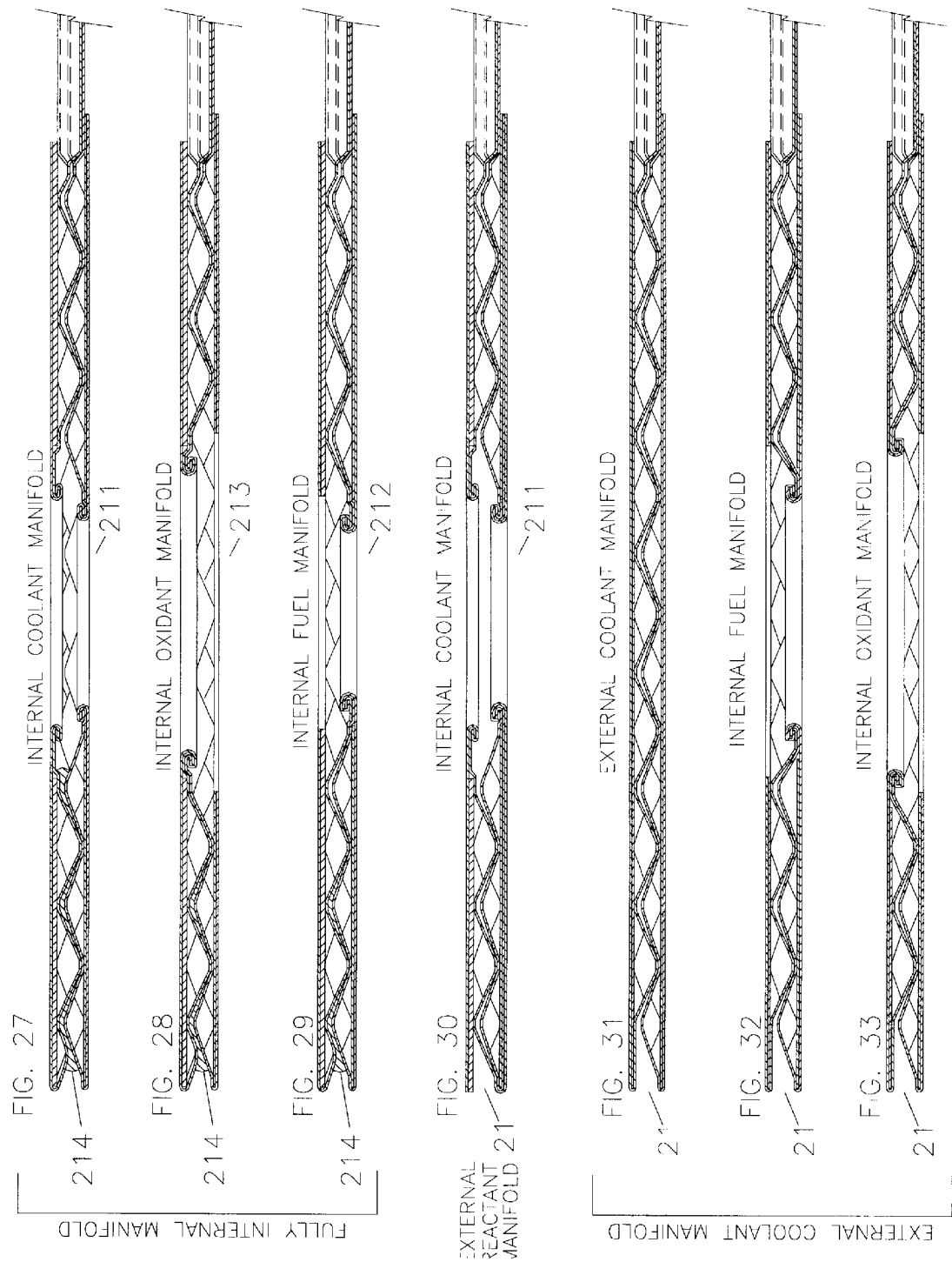

SECTION KK

SECTION LL

FUEL CELL BIPOLAR SEPARATOR PLATE AND CURRENT COLLECTOR ASSEMBLY AND METHOD OF MANUFACTURE

CROSS-REFERENCE TO RELATED APPLICATIONS

This application claims priority to Provisional Patent Application No. 60/165,712, filed Nov. 16, 1999; Provisional Patent Application No. 60/187,526, filed on Mar. 7, 2000; and Provisional Patent Application No. 60/242,760, filed on Oct. 24, 2000.

INTRODUCTION

The present invention is directed to a fuel cell bipolar separator plate and current collector assembly, and, more particularly, to an improved fuel cell bipolar separator plate and collector assembly having improved manufacturability and cooling, and a corresponding method of manufacture.

BACKGROUND OF THE INVENTION

A fuel cell stack consists of multiple planar cells stacked upon one another, to provide an electrical series relationship. Each cell is comprised of an anode electrode, a cathode electrode, and an electrolyte member. A device known in the art as a bipolar separator plate, an interconnect, a separator, or a flow field plate, separate the adjacent cells of a stack of cells in a fuel cell stack. The bipolar separator plate may serve several additional purposes, such as mechanical support to withstand the compressive forces applied to hold the fuel cell stack together, providing fluid communication of reactants and coolants to respective flow chambers, and to provide a path for current flow generated by the fuel cell. The plate also may provide a means to remove excess heat generated by the exothermic fuel cell reactions occurring in the fuel cells.

Each individual cell produces about 0.5–1.0 volts DC. Electrical current output capacity is based upon the area of the fuel cell electrodes times the current density capacity of the cell. Maximum achievable current density, measured in amps/cm$^2$, varies from fuel cell type to fuel cell type. Therefore, the quantity of cells (voltage), the area of the cells (current), and the current density of the cells determine the kW output capacity of a fuel cell stack. In order to achieve output capacities suitable for distributed generation, the fuel cell stack must output a minimum of about 2–10 kW for residential applications, to about 50–100 kW for light commercial/industrial applications. In these scenarios, the fuel cell stack may consist of from about fifty to in excess of one-hundred-and-fifty cells having an area of about 200 cm$^2$ to about 3000 cm$^2$.

Another important measure of a fuel cell stack, in addition to current density, is its volumetric power density. High volumetric power density is desirable for both stationary and transportation applications of fuel cells. Volumetric power density is measured as the watt density per cm$^2$ of an individual cell times the quantity of cells per linear centimeter of stack height. Therefore, it is desirable to design thin cells to achieve high volumetric power density.

While current density is more a function of the individual fuel cell type, volumetric power density is mostly a function of the physical design of the fuel cell components and the design of the bipolar separator plate.

The design of bipolar separator plates in the prior art has been driven by many wide ranging factors, such as cell chemistry, reactant flow configurations, material selection, system pressurization, operating temperature, system cooling requirements, and intellectual property considerations.

However, there are several common characteristics of bipolar separator plate design. Prior art bipolar separator plates have typically been produced in a discontinuous mode utilizing highly complex tooling that produces a plate with a finite cell area. Alternatively, prior art plates having a finite area may be produced from a collection of a mixture of discontinuously and continuously manufactured sheet-like components that are assembled to produce a single plate possessing a finite cell area. U.S. Pat. No. 6,040,076 to Reeder teaches an example of a Molten Carbonate Fuel Cell (MCFC) bipolar separator plate produced in this fashion, where plates are die formed with a specific finite area of up to eight square feet. U.S. Pat. No. 5,527,363 to Wilkinson et. al. teaches an example of a Proton Exchange Membrane Fuel Cell (PEMFC) "embossed fluid flow field plate," also die formed with a discrete finite area. U.S. Pat. No. 5,460,897 to Gibson et. al. teaches an example of a Solid Oxide Fuel Cell (SOFC) interconnect, also produced having a finite area. Bipolar separator plates produced with a discontinuous finite area do not enjoy the advantages of continuous production methods such as are commonly used to produce the electrodes and electrolyte members of the fuel cell. Continuous production methods provide cost and speed advantages and minimize part handling. Continuous production using what is known as progressive tooling allows the use of small tools that are able to produce large plates from sheet material. The plate described in Reeder is able to be produced in a semi-continuous fashion, but requires tooling possessing an area equivalent to that of the finished bipolar plate area. The plate described in Reeder requires separately produced current collectors for both the anode and cathode. These current collectors may be produced in a continuous fashion. However, the resultant assembly is material intensive, comprised of three sheets of material. The area of the plate created by the design is fixed and unalterable unless retooled.

Production methods that utilize molds to produce plates from non-sheet material, such as injection molding with polymers, are wholly unable to stream the production process in a continuous mode. As a result, discontinuous production methods require complex tooling and are speed limited. Complex tooling further inhibits design evolution due to the costs associated with replacing or modifying the tools.

Another commonality among the bipolar separator plate designs of the various fuel cell types is the material of construction. Although carbon graphite, polymers, and ceramics are common examples of the materials of choice for the bipolar separator plate of the various fuel cell types, sheet metal can also be found as an example of the material of choice for each of the fuel cell types in the prior art literature. For example, Reeder teaches a metallic MCFC bipolar separator plate. U.S. Pat. No. 5,776,624 to Neutzler teaches a metallic PEMFC bipolar separator plate. Gibson teaches a metallic SOFC bipolar separator plate. U.S. Pat. No. 6,080,502 to Nolscher et. al. teaches a metallic bipolar separator for fuel cells and denotes fuel cells as including Phosphoric Acid Fuel Cell (PAFC) and Alkaline Fuel Cell (AFC). Sheet metal, or metal foil, permits the application of high-speed manufacturing methods such as continuous progressive tooling. Metallic bipolar separator plates for fuel cells further provide for high strength and compact design.

A third commonality of bipolar separator design can be found in the various methods to provide a means to cool the fuel cell. Although some fuel cell stack designs elect to disperse this critical function via dedicated cooling plates at intervals of several cells, or within a wholly separate cooling section, examples of a bipolar separator plate from each fuel cell type can be found to include an integral coolant chamber. These chambers may be designed for gaseous coolant, liquid coolant, or endothermic fuel reforming. Providing a coolant chamber to each individual bipolar separator plate presents engineering and design challenges. Specifically, plate thickness and reactant/coolant manifolding are impacted by the addition of a coolant chamber. The impact on plate thickness can be minimized by using a liquid coolant that possesses a greater heat carrying capacity than do gaseous coolants such as air. Neutzler teaches a "coolant flow passage" centrally located between two outer metallic sheets. Nolscher teaches a "cooling medium distribution duct" also located between two metallic sheets. In both cases, the design utilizes two opposing sheets of material die-formed with a plurality of grooves, or ribs. The cooling chamber is formed when the maximum elevation of one sheet rests on the maximum depression of the subsequent sheet. Both sheets are structural members of the bipolar plate and therefore must be of sufficient strength and robustness to withstand the compressive sealing force applied to the assembled fuel cell stack. U.S. Pat. No. 5,795,665 to Allen teaches a "reforming compartment" within an MCFC bipolar separator plate formed when the maximum elevation of a dimpled single-piece bipolar separator rests on the maximum depression of a dimpled subassembly of active components and current collector with a flat sheet barrier disposed between the two components. The resulting chamber is equipped with a reforming catalyst for endothermic stream reforming of fuel.

A fourth commonality of bipolar separator design can be found in the various reactant flow and reactant manifold configurations. The existing alternatives for flow configuration are co-flow, counter-flow, and cross-flow, as well as variations utilizing serpentine flows. The existing designs for reactant and coolant manifolds are internal, external, or a combination of internal and external. Manifolding the fuel, oxidant and coolant to provide uniform flow to the surfaces of the bipolar separator plate contributes to the overall design complexity. Neutzler teaches parallel flow of reactants and cross-flow of the coolant via manifold openings surrounding the periphery of the plate assembled from three components. Nolscher teaches parallel flow of reactants and coolant manifolded via "distribution ducts" that extend almost entirely along opposing edge areas of the bipolar separator plate assembled from two components. The distribution ducts of Nolscher are said to provide more uniform flow of flow streams than that which is provided from "point-like" inlets. However, this design would be limited in practical applications employing cell areas with a large dimension perpendicular to the direction of the flow streams in the active area. This design is not discussed in Nolscher as being produced in continuous form or consisting of repeated sections.

A fifth commonality of bipolar separator design can be found in the various methods used to achieve efficient packaging of the plate to yield a thin structure promoting high volumetric power density. Often, however, volumetric power density is difficult to achieve when attempting to utilize the optimum configurations for the latter commonalties of material of construction, cell cooling, and reactant/coolant flow and manifold configuration.

A need exists for a bipolar separator plate produced in continuous mode from sheet material with a reactant/coolant flow and manifold configuration having a thin structure with low material content, a coolant flow path, uniformity of reactant/coolant flow streams, that can be produced in high volume at high speed, and that is applicable to several types of fuel cells.

The need is further exemplified when contemplating a staged-array of fuel cells bottomed by fuel cells. Clearly, in this scenario, an MCFC stack staged with an SOFC stack would greatly benefit from uniformity in design of the bipolar separator with respect to manifolding interconnections and general system packaging and design.

SUMMARY

Manufacture of the bipolar separator plate of the present invention is accomplished by producing repeated finite sub-sections of a bipolar separator plate in continuous mode. The plate may be cut to any desirable length in multiples of the repeated finite sub-section and processed through final assembly, or recoiled for further processing.

The structure of the separator plate that creates flow channels and manifolds is stretch-formed into finite sub-sections by what is known in the art as progressive tooling. Progressive tooling is an efficient means to produce complex stampings from a series of low-complexity tools, or, as a means to produce a product whose area is substantially larger than the tool that is utilized. As a result, the bipolar separator plate of the present invention produced in this manner possesses modularity not found in conventional discontinuous bipolar separator plate designs. The scaleable cell area of such a separator plate provides responsiveness to a wider range of fuel cell applications, from residential to light commercial/industrial to automotive, without deviating from the underlying geometries. Though fuel cell stacks clearly are scaleable by altering the quantity of cells comprising the stack of cells, it is advantageous to efficiently alter the area of the cells as well. As is well known in the art, cell count determines stack voltage while cell area determines stack current.

What is particularly advantageous with the present invention is that the repeated finite sub-sections of the continuously produced bipolar separator plate do not require discontinuity of the electrodes and electrolyte member of the fuel cell. Many of the conventional designs of the prior art bipolar separator designs are quite capable of continuous, progressively tooled, manufacture. However, all prior art designs would require discontinuity of the electrodes and electrolyte members in order to properly fit the resultant repeated finite sub-sections. Many prior art designs are incapable of continuous progressive tooling due to the nature of the fuel, oxidant, and coolant manifolding and flow pattern designs.

The present design provides for parallel flows of reactants and coolant within each sub-section. The parallel flows are arranged perpendicular to the direction of manufacture. The flow channels are comprised of parallel ribs stretch-formed into the main body of the bipolar separator plate. Stretch-forming is known in the art as a means to form sheet materials into complex shapes and is distinguished from draw forming by the avoidance of material from outside the confines of the tool flowing into the tool during the stamping process. The reactant flow format of the design may be any combination of co-flow or counter-flow to satisfy the desired operational characteristics of the fuel cell type. Each sub-section is provided with at least one pair of internal manifolds and at least one pair of external manifolds within the edge sealing areas of the plate. The method of manufacture results in the manifolds being repeated along the opposing edge sealing areas. This feature promotes uniformity of reactant and coolant flow distribution. The manifolds of each sub-section and the area of each sub-section are stoichiometricly matched to provide the desired electrochemical reaction rates and pressure-drops within that particular sub-section.

These and additional features and advantages of the invention disclosed here will be further understood from the following detailed disclosure of preferred embodiments.

BRIEF DESCRIPTION OF THE DRAWINGS

Preferred embodiments are described in detail below with reference to the appended drawings.

FIG. 8 is a cross-section of the manifold area of the separator plate of FIG. 1, taken along line B—B of FIG. 1

FIG. 9 is a cross-section of the manifold area of the separator plate of FIG. 1, taken along line C—C of FIG. 1

FIG. 10 is a cross-section of the manifold area of the separator plate of FIG. 1, taken along line D—D of FIG. 1, shown sectioning through the crown of a row of manifold area dimples.

FIG. 20 is a cross-section of the anode and cathode end caps of the separator plate of FIG. 1, ken along line E—E of FIG. 1.

FIG. 21 is a cross-section of the anode end cap of the separator plate of FIG. 1, taken along line F—F of FIG. 1.

FIG. 22 is a cross-section of the corner seal of the separator plate of FIG. 1, taken along line G—G of FIG. 1.

FIG. 23 is an exploded view of the separator plate of FIG. 1.

FIG. 24 is a cross section of another preferred embodiment of a separator plate of the present invention, showing a center chamber of the separator plate and taken along line H—H of FIG. 26

FIG. 25 is a cross-section of the center chamber taken along line J—J of FIG. 26

FIG. 27 is a cross-section of an internal coolant manifold of the separator plate of FIG. 26.

FIG. 28 is a cross-section of an internal oxidant manifold of the separator plate of FIG. 26.

FIG. 29 is a cross-section of an internal fuel manifold of the separator plate of FIG. 26.

FIG. 30 is a cross-section of an internal coolant manifold of the separator plate of FIG. 26, when a reactant is externally manifolded.

FIG. 31 is a cross-section of an external coolant manifold of the separator plate of FIG. 26.

FIG. 32 is a cross-section of an internal fuel manifold of the separator plate of FIG. 26, when a coolant is externally manifolded.

FIG. 33 is a cross-section of an internal oxidant manifold of the separator plate of FIG. 26, when a coolant is externally manifolded.

DETAILED DESCRIPTION OF THE INVENTION

Figure 1:
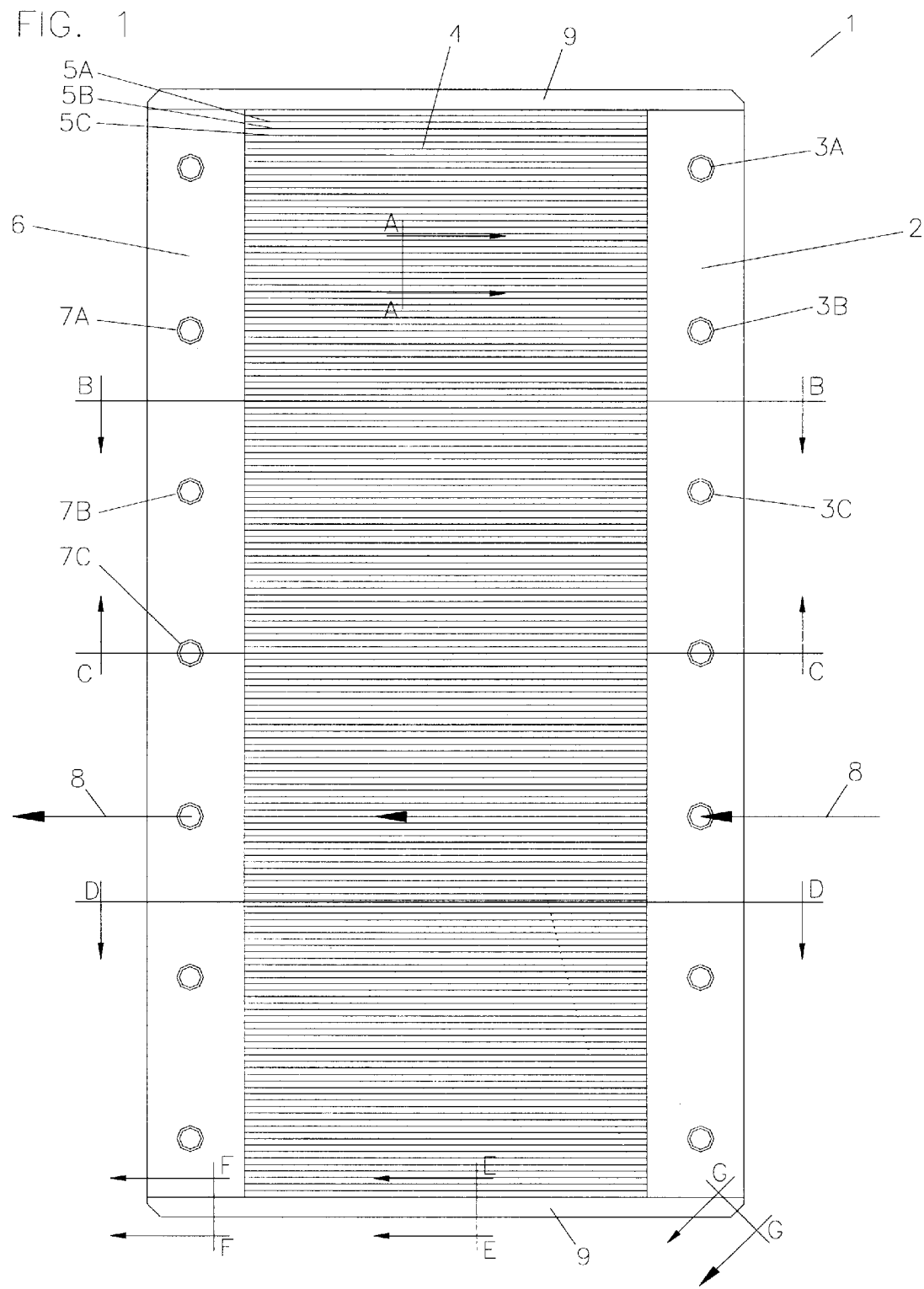
FIG. 1 is a plan view of the anode side of a separator plate of the present invention

FIG. 1 shows the anode side of a fuel cell separator plate 1. The separator plate consists of several distinct areas. The anode fuel inlet manifold seal area 2 is shown to extend along length of one side of the separator. Within the anode fuel inlet manifold seal area 2 are a plurality of fuel inlet manifolds 3a, 3b, 3c, . . . The ribbed active area 4 of the separator is formed with a plurality of ribs 5a, 5b, 5c . . . The anode fuel outlet manifold seal area 6 is also shown to extend along the length of side of the separator opposite the seal area 2. Within the anode fuel outlet manifold seal area 6 are a plurality of fuel outlet manifolds 7a, 7b, 7c, . . . The fuel outlet and inlet manifolds are in fluid communication with ribs 5a, 5b, 5c, . . . of active area 4.

The anode gasses 8 of the fuel cell enter the separator at the fuel inlet manifolds 3a, 3b, 3c, . . . and are distributed to the ribs 5a, 5b, 5c, . . . of active area 4 to react with the anode electrode (not shown) which, when assembled with the separator, resides upon the ribs. The anode gasses 8 then exit the fuel cell at the fuel outlet manifolds 7a, 7b, 7c . . . In this manner a complete fuel flow circuit through the fuel cell separator plate 1 is established.

Anode end seal areas 9 are provided at the ends of separator plate 1, adjacent the fuel manifold seal areas 2, 6. In this manner, a peripheral seal area is established to seal and contain the fuel gas from leakage and premature reaction with the cathode gasses.

Figure 2:
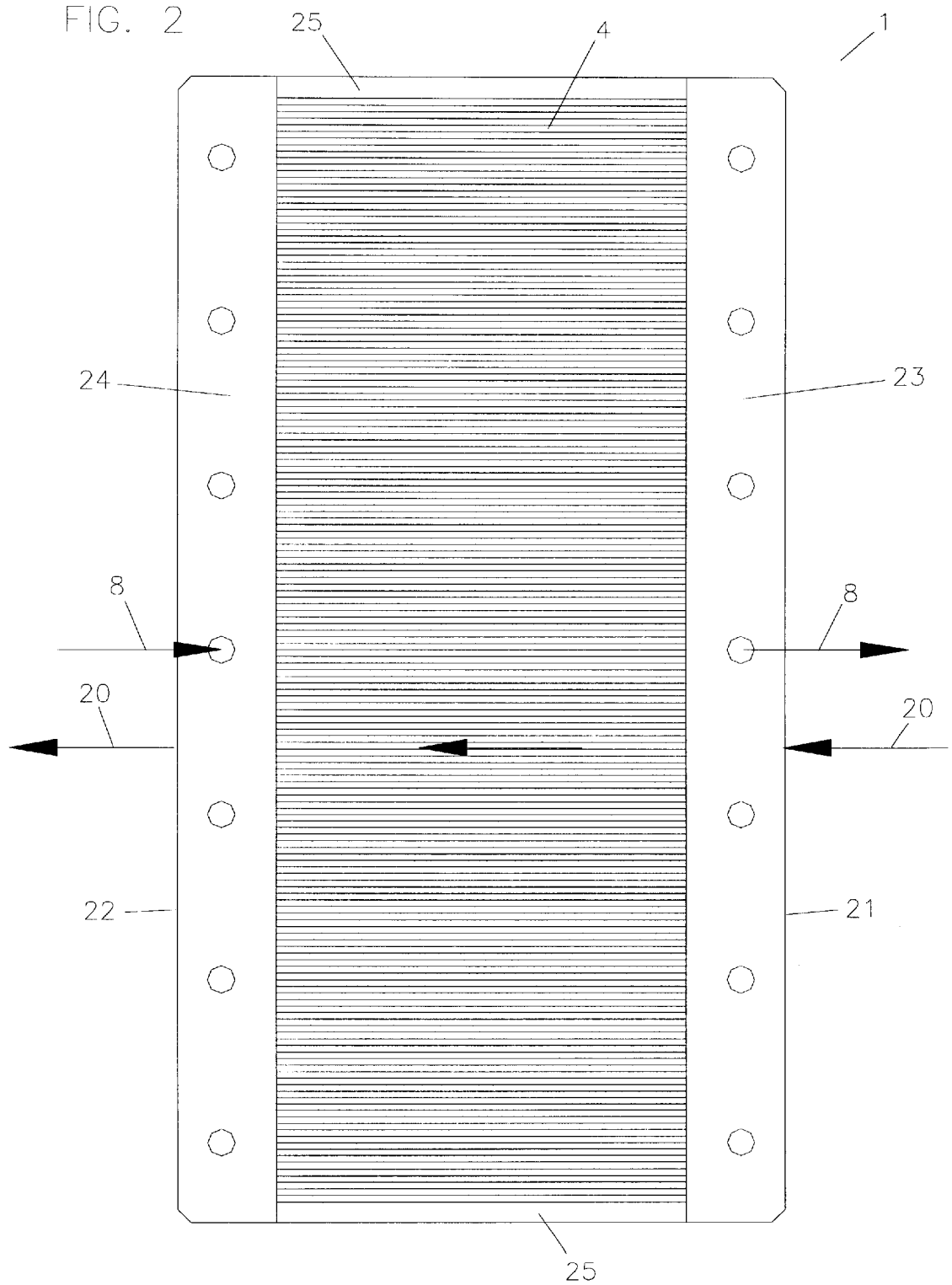
FIG. 2 is a plan view of the cathode side of the separator plate of FIG. 1.

FIG. 2 shows the cathode side of the separator plate 1, which consists of distinct regions similar to those of the anode side, including a cathode fuel inlet manifold seal area 23, a ribbed active area 4, and a cathode fuel outlet manifold seal area 24. The cathode side of the separator is also fitted with cathode end seal areas 25 to establish a peripheral seal to contain the cathode gas from leakage and premature reaction with the anode gasses.

The cathode gas 20 enters the separator at an open edge 21, which is in fluid communication with the ribs of active area 4. The cathode gas traverses the active area to react with the cathode electrode which, when assembled with the separator, resides upon the ribs. The cathode gas exits the fuel cell at an open edge 22, which also is in fluid communication with the ribs of active area 4. In this manner a complete oxidant flow circuit through fuel cell separator plate 1 is established. The cathode gas may flow counter-current to the anode gas, as shown, or may flow co-current to the anode gas.

Figure 3:
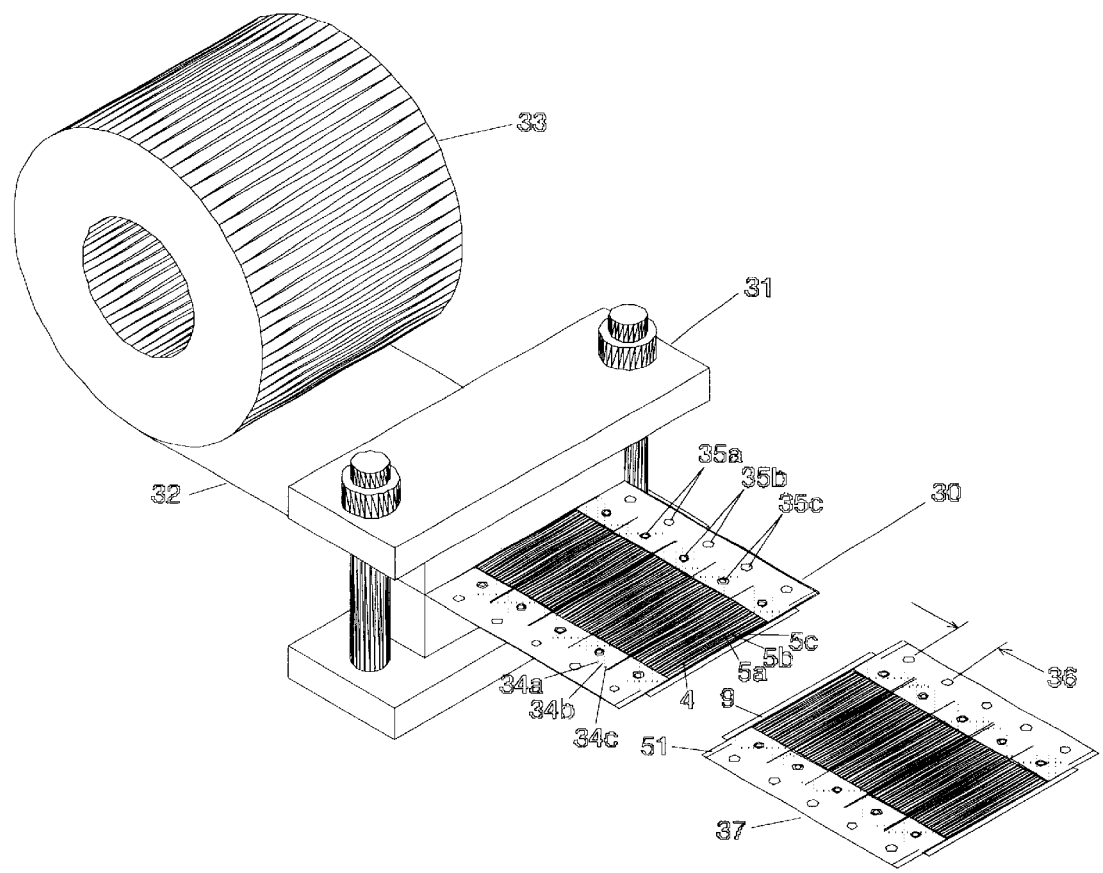
FIG. 3 is a preferred method of manufacture of the separator plate of FIG. 1.

FIG. 3 illustrates a preferred method of manufacture for the main body 30 of the separator plate 1. Stamping tooling 31 is provided to receive raw material in the form of sheet metal 32 dispensed from a coil 33. Stamping tooling 31 is configured to form and shape the sheet metal 32 in a manner which imparts structure to the sheet metal in the form of a plurality of ribs 5a, 5b, 5c, . . . within the ribbed active area 4. Additional structure is imparted by the tooling 31 in the form of a plurality of dimples 34a, 34b, 34c, . . . on both of the opposing edge areas of the main body 30. A plurality of paired through holes 35a, 35b, 35c, . . . are punched on both of the opposing edge areas of the main body 30. The stamping tooling 31 is further configured to impart these aforesaid features in discrete segments 36 upon each open/shut cycle of the tool. The discrete segment 36 includes at least one set of paired through holes 35a on both opposing edge areas surrounded by a plurality of dimples 34a, 34b, 34c . . . A plurality of ribs 5a, 5b, 5c, . . . are also included in each segment 36. In operation, the stamping tool closes on sheet metal 32 with sufficient force and accuracy to impart the aforesaid features with appropriate precision and to avoid fracture of the sheet metal. Upon opening of the stamping tooling the sheet metal is automatically advanced by conventional feeder mechanisms a distance equivalent to the pitch of the paired through holes 35a, 35b, 35c, . . . This distance is equivalent to the length of each discrete segment 36. The stamping tooling 31 is now poised to continue to repeat this cycle, and will produce the main body 30 of the separator until the sheet metal 32 is exhausted from the coil 33. Those skilled in the art will recognize this method of manufacture, which is commonly referred to as "progressive" tooling manufacture. The set up of the tooling 31 is further provided with the ability to advance the sheet metal 32 without closing, thus providing intermittent areas of the sheet metal free of structure. The tooling 31 is further provided with a shear downstream of the press tooling 31 such that a cut through the sheet metal may be made in the intermittent area. The downstream tooling is further provided with a notching and forming apparatus so as to create a recessed area 51 and an end seal area 9 on both the leading and trailing ends of the sheet metal 32 as it is advanced through the tooling 31. The ability to intermittently cut the main body 30 of the separator, as it is continuously produced by the tooling 31, permits the tool operator to selectively produce a plurality of separator plates of any desirable length. The width of the main body 30 of the separator is fixed and unalterable by the tooling 31. However, the area of a fuel cell governs the capacity for power output. The area of the separator produced by the tooling 31 is alterable by producing longer sections of main body 30. The tooling 31 may produce separators with a plurality of paired fuel manifolds and a substantially large active area with subsequent large capacity for power output. The area of the separator produced by the tooling 31 is at the discretion of the tooling operator.

Figure 4:
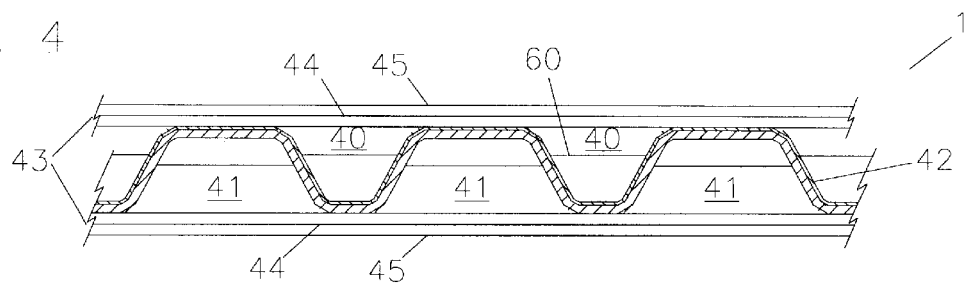
FIG. 4 is a cross-section of the flow ribs of the separator plate, taken along line A—A of FIG. 1

FIG. 4 shows a cross-section through the active area of the separator plate I taken along line A—A of FIG. 1. From this perspective, it is possible to see the geometry of the anode flow channels 40 and the cathode flow channels 41. It can further be seen that the cross-sectional areas of the anode flow channel 40 is smaller than the cathode flow channel 41. This bias of flow channel cross-sectional area is intended to accommodate the significant difference in flow rate of the anode and cathode reactant gasses. Those skilled in the art will know that the cathode gas flow rate may be substantially greater than the anode gas flow rate. By intentionally biasing the flow areas of the flow channels, it is possible to achieve a more balanced gas pressure differential between anode and cathode, which provides beneficial effects relative to the electrolyte membrane disposed between the electrodes in an assembled fuel cell stack. Excessive differential pressure between anode and cathode may result in undesirable cross-over of reactant gasses through the electrolyte membrane. Such cross-over may result in undesirable combustion and premature failure of the fuel cell.

From FIG. 4 it may further be seen that the material 42 comprising the ribbed active area is, in certain preferred embodiments, a composite. Those skilled in the art will know that the corrosive environment of the various fuel cell types often require selections of materials tailored specifically to the individual anode and cathode environments. For example, the anode chamber of a carbonate type fuel cell generally is constructed of, or plated with, nickel, while the cathode chamber is constructed of stainless steel. Typically, the separator is a bimetallic composite of these materials that may be mill-clad into a single sheet, or may also consist of two separate sheets of material of an alloy appropriate for their respective environments. Metallic bipolar separators for PEMFC's require the selection of alloys and/or coatings that inhibit the transfer of metallic ions to the membrane. Metal ions are thought to contaminate the membrane of PEMFC's.

Furthermore, from FIG. 4 it may be seen that shim 44 is used to elevate the outer surface of seals 45 so as to be flush with the electrodes which reside on the ribs of an assembled fuel cell.

Figure 5:
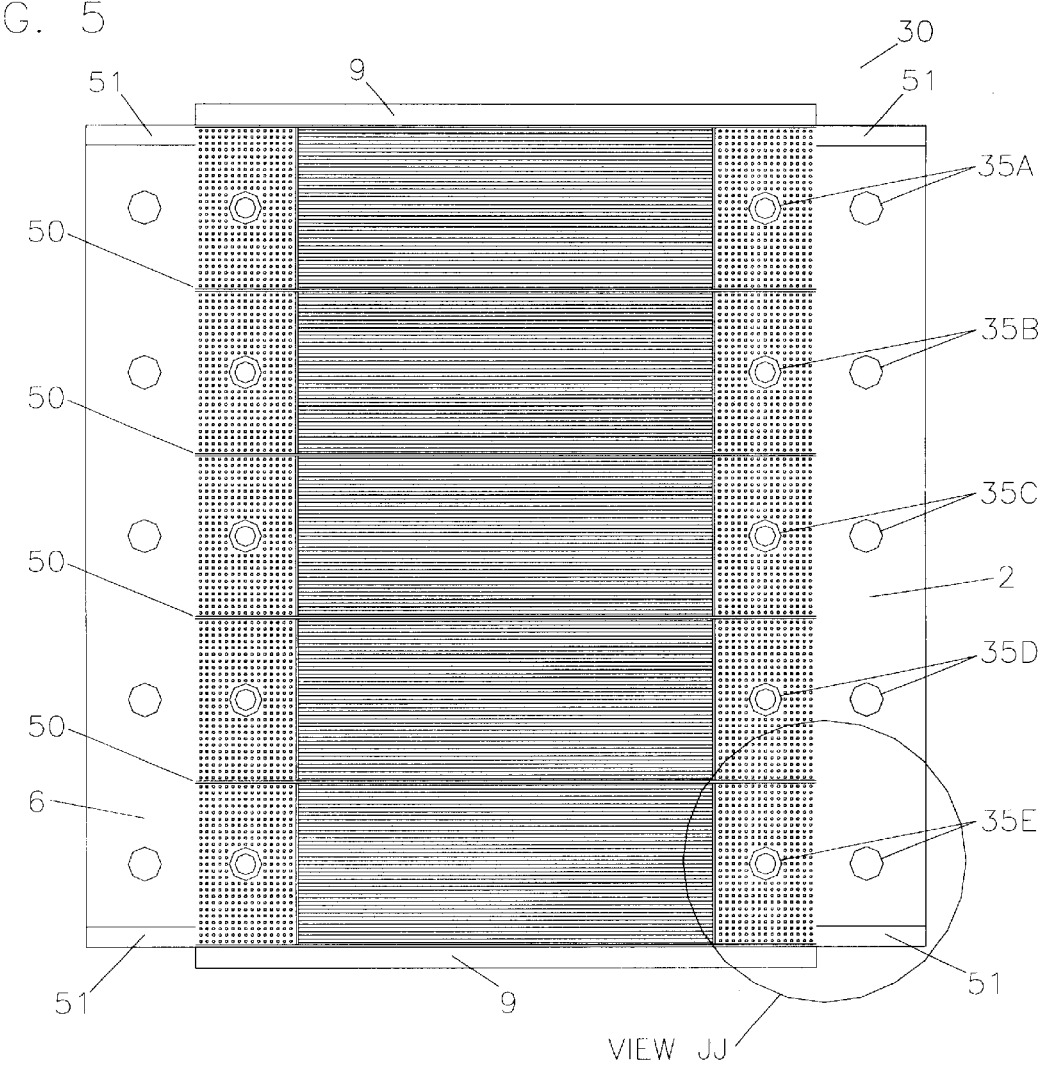
FIG. 5 is a plan view of the stamped blank of the separator plate of FIG. 1 prior to final assembly.

FIG. 5 shows a plan view of the stamped main body 30 of the separator plate. It can be seen that in the illustrated embodiment, the stamping tool cycled five times to produce a separator with five segments, as evidenced by the five sets of paired through holes 35a, 35b, 35c, 35d, 35e on opposing edge areas of the separator plate.

Further, it may be seen that a dividing rib 50 is disposed between adjacent segments of the main body 30 of the separator. These dividing ribs are an artifact of the progressive tooling, which uses a pressure pad to grip the sheet metal and prevent draw-in of sheet metal through the use of a pinch bead. It is through the use of the pressure pads and pinch beads that the material consumed to produce the structure of the separator is only from within the foot print of the tool rather than from regions exterior to the closed stamping tool. In this manner it is possible to deform the ribs and dimples without causing excessive distortion in the outer edges of the main body. Since the ribs and dimples are formed from stretching the sheet metal, rather than from drawing in material from outside the tooling area, the height or depth of these features are limited to the extent of the elongation properties of the sheet metal. As such, the flow area of the chambers formed by the ribs and dimples is restricted by the maximum achievable height of the ribs that does not result in excessive elongation and fracture of the sheet metal. Therefore, the length of the chambers formed by the ribs, as defined by the distance between the opposing fuel manifold seal areas 2, 6, or, the width of active area 4, is determined by the maximum tolerable pressure drop along the flow ribs. The tooling for this dimension of the separator is fixed and unalterable, but, as previously stated, the length of the separator perpendicular to the gas flow ribs is at the discretion of the tooling operator.

The pressure-drop through the bipolar separator plate of some types of fuel cells and some applications of fuel cells is an important consideration. For example, Molten Carbonate Fuel Cells (MCFC) cannot tolerate high differential pressure across the electrolyte membrane. The gas seal between the anode and the cathode in an MCFC is created by the presence of a liquid electrolyte held within the micro pores of the electrolyte membrane, also known as an electrolyte matrix. Excessive differential pressure will force the electrolyte out of the micro pores and, therefore, create a fluid flow path for reactant gas cross-over through the electrolyte membrane. Therefore, it is desirable to maintain a low differential pressure at all points between the anode chamber of the fuel cell and the cathode chamber of the same fuel cell. An effective means of achieving low differential pressure is to design for low pressure-drop through both the anode and cathode flow fields.

Some types of fuel cells can tolerate very high differential pressures across the electrolyte membrane. For example, the Proton Exchange Membrane Fuel Cell, also known as the Polymer Electrolyte Membrane Fuel cell (PEMFC), utilizes an electrolyte membrane consisting of a polymer sheet. There is no liquid electrolyte within this type of fuel cell, although the membrane must remain hydrated. PEMFC's can tolerate high differential pressure between the anode and cathode chambers across the membrane. Furthermore, it is well established that pressurization of the reactant gases flowing through the fuel cell will increase fuel cell performance. However, pressurization of the fuel cell system adds complexity and cost to the fuel cell system. Some applications of fuel cells benefit from a simplified non-pressurized system. For example, pipeline natural gas is delivered to homes and commercial buildings through an existing infrastructure of pipes and meters. The piping infrastructure delivers the natural gas at low pressure. Delivery pressures for natural gas range from 0.25 to 2.0 PSIG. Fuel cell systems designed to operate directly from pipeline natural gas do not require additional boosters or compressors. Furthermore, air blowers that provide the motive force to send the cathode reactant gas through the fuel cell system are generally limited to a delivery pressure in the same range as that of the pipeline natural gas. Fuel cells designed to operate directly with air blowers do not require additional boosters or compressors. In this scenario, where the fuel cell system is designed to operate at low pressure (<2.0 PSIG), it is desirable to design the flow fields of both the anode and cathode flow chambers for low pressure-drop. This is achieved by providing large cross-sectional flow area to the flow channels and/or providing a short flow path to the flow channels. The length of the flow path for a MCFC application of the present invention may be different than the length of the flow path for a PEMFC application of the present invention. Likewise, the cross-sectional flow area for MCFC may be different than the PEMFC. In this scenario, tooling that produces an MCFC plate will be different than tooling that produces PEMFC plate.

The outer edges of the main body 30 of the separator shown in FIG. 5 are subsequently folded up and over to create the anode inlet and outlet manifold seal areas 2, 6, as well as the anode end seal areas 9. Recessed area 51 is provided at the ends of anode manifold seal areas 2, 6 for the purpose of receiving the overlapping portion of the flaps forming end seal areas 9. In this manner, and through the application of certain shims such as shims 44 shown in FIG. 4, FIG. 21, and FIG. 22 as well as other shims such as shims 110, 111 shown in FIG. 20, the surface of the peripheral seal area of an assembled separator is maintained in a flush and smooth state. The application of said shims also permits the use of thin sheet metal 32 for the construction of the main body 30 of the separator plate. The use of thin sheet metal 32, on the order of 0.005 inches to 0.010 inches thick, enables the application of eyeleting techniques and crimping techniques to seal the fuel chamber of the separator plate without welding, and without thick cross-sections of crimped, beaded, or eyeleted sheet metal at the seals.

Figure 6:
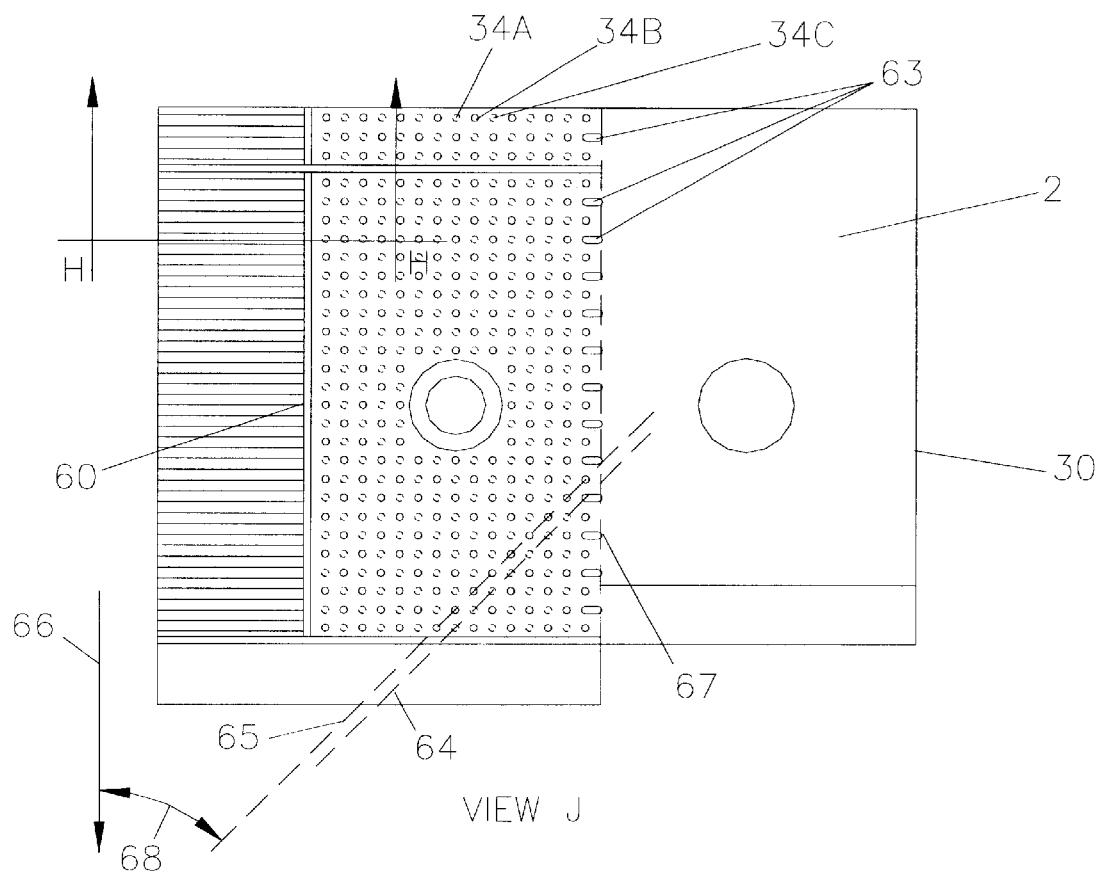
FIG. 6 is an enlarged view of a corner of the stamped blank of FIG. 5.

An area of the corner of the main body 30, denoted as J—J in FIG. 5, has been selected for enlargement in FIG. 6. From FIG. 6 it can be seen that the dimples 34a, 34b, 34c, . . . are arranged in a pattern of a plurality of rows 64, 65. The rows of dimples are set at an angle 68 equivalent to forty-five degrees relative to the direction of manufacture 66 of the main body 30. Within a given row 64, the dimples extend only upwardly from the surface of the main body 30 of the separator plate. The dimples of adjacent row 65 extend downwardly from the surface of the main body 30. The rows of dimples alternate in this manner either extending upwardly or downwardly. Thus, the peak of a dimple is surrounded by the depressions of the four adjacent and opposing dimples. Therefore, a flow field is formed on each side of the sheet metal. The flow fields provide for the ability for fluid flow in any direction across the surface of both sides of the dimpled area. In this manner the reactant gasses are free to distribute from the inlets to the ribbed active area and onward to the outlets of the assembled separator.

The rows 64, 65 of dimples 34a, 34b, 34c, . . . are positioned at an angle 68, preferably equivalent to forty five degrees, to provide a region between adjacent dimples that is generally in the middle relative to the peaks of the dimples. In so doing, the sheet metal is substantially flat and is optimized to receive bends and folds at the edges of the separator to produce open edge 21.

Figure 7:
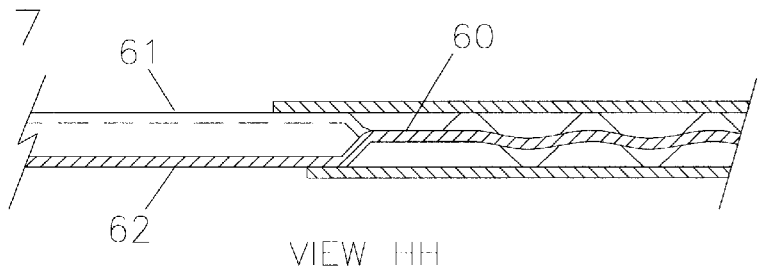
FIG. 7 is a cross-section of the corner of the stamped blank of FIG. 5, taken along line H—H of FIG. 6.

The aforesaid region between dimples has been bisected by section line H—H and is seen in FIG. 7 to be substantially planar for receiving folds and generally centered vertically.

Additionally seen in FIG. 6 are a plurality of upward facing elongated dimples 63 disposed between the downward facing dimples at the outer edge of the dimpled area of the main body of the separator. The elongated dimples 63 serve to maximize the open area of the open edge of the external manifolds by transitioning the sheet metal of the main body 30 towards the upward facing anode side of the main body in the area where the fold 67 of the seal 2 occurs.

It may further be seen that a dividing section 60 is disposed between the ribbed active area and the dimpled manifold area. The purpose of the dividing section 60 is to transition the sheet metal from the dimpled structure to the ribbed structure. A cross-section taken along line H—H of FIG. 6 is shown in FIG. 7, where it can be seen that the elevation of the dividing section 60 may additionally be biased towards either the anode surface 61 or the cathode surface 62. This bias again relates to the significant difference between the flow rates of the reactant gasses. The dividing section 60 may further be viewed in FIG. 4, where it may be seen that the surfaces of the dividing section 60 are visible on both the anode side and the cathode side. The dividing section 60 is seen to extend to the edge of the separator. In the fuel chamber, the dividing section 60 is capped at the edge by the dividing rib 50 and fold of the anode end seal In the oxidant chamber, the dividing sect 60 is capped by dividing rib 50.

In FIG. 8 a cross-section taken along line B—B of the separator shown in FIG. 1 is provided. The outer edges of the main body 30 can be seen to have been folded up and over at fold lines 67 to create the fuel inlet and outlet manifold seal areas 2 and 6. Further, it can be seen that the material forming the seal areas 2 and 6 extends out and over the ribbed active area 4 of the separator.

A cathode fuel inlet manifold seal area 23 and a cathode fuel outlet manifold seal area 24 are seen at the opposing faces of the separator. These components consist of independent sheets of material joined at the periphery of each of the internal manifolds. It can be seen that the cathode fuel inlet and outlet manifold seal areas 23 and 24 also extend out and over the ribbed active area 4 of the separator, but not to the same extent as the anode seal areas 2 and 6. This bias is provided to offset the mechanical stresses induced by the discontinuity created by the transition from the electrode area to the seal area of an assembled fuel cell in an assembled fuel cell stack. It can be seen that open edge 21 permits access of cathode gasses 8 to the cathode flow ribs and onward to the outlet through the dimpled structure.

FIG. 9 is a cross-section taken along line C—C of the separator plate 1 shown in FIG. 1. This figure shows sections through the fuel inlet and outlet manifolds to reveal the fuel flow path. Fuel gas 8 can be seen to enter at internal manifold 3 and access the ribbed active area 4 via the dimpled structure. The fuel gas 8 will then traverse the ribbed active area 4 and exhaust through the internal manifold 7.

FIG. 10 provides a cross-section taken along line D—D of the separator plate 1 shown in FIG. 1. This section passes through the center of the peaks of the dimples. The adjacent non-sectioned dimples are revealed in the background of the view. This view differs from that shown in FIG. 8 because the section taken at line B—B of FIG. 8 does not bisect the center of the dimples, but rather bisects the region between the dimples. Because the dimples are arranged in rows set at an angle of 45 degrees, the section line D—D captures dimples alternately extending upward and downward from the surface of the separator plate 1.

FIGS. 11 through 19 illustrate the preferred method for sealing the internal fuel manifold and joining the cathode fuel inlet and outlet manifold area seals 23, 24 to the main body 30 of the separator.

Figure 11:
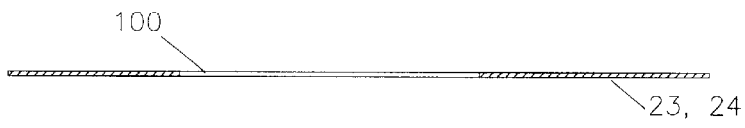
FIG. 11 through FIG. 19 illustrate the preferred method of joining and sealing the internal fuel manifold of the separator plate of FIG. 1.

In FIG. 11, a through hole 100 is die punched in cathode fuel inlet, or cathode fuel outlet manifold area seals 23, 24.

Figure 12:
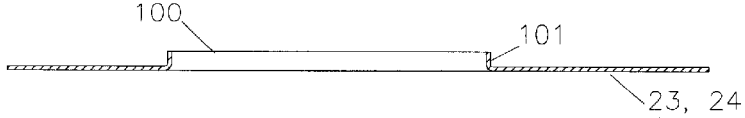

In FIG. 12, the through hole 100 is eyeleted to form a raised collar 101.

Figure 13:
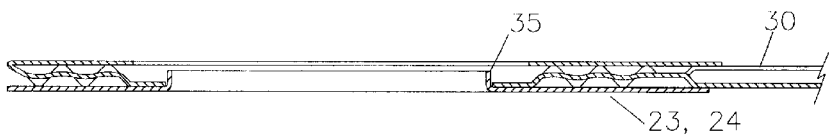

In FIG. 13, the cathode fuel inlet/outlet manifold area seal 23, 24 is assembled to the main body 30 by engaging the collar 101 with the through hole 35 of the main body of the separator.

Figure 14:

In FIG. 14, the collar is flared 102 to retain the cathode fuel inlet/outlet manifold area seal 23, 24 to the main body of the separator.

Figure 15:
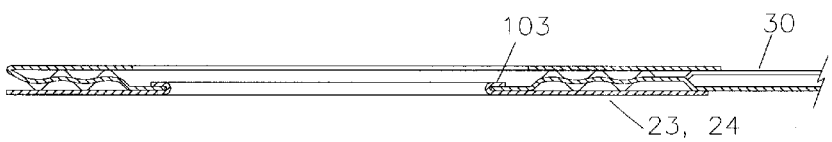

In FIG. 15, the flare is flattened 103 to seal the cathode fuel inlet/outlet manifold area seal 23, 24 to the main body 30 of the separator.

Figure 16:
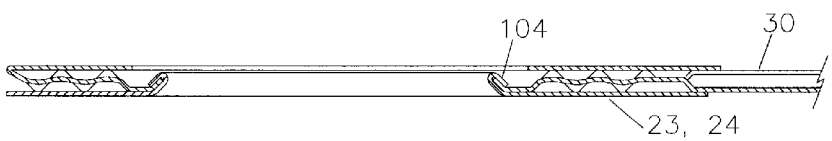

In FIG. 16, the flattened flare 103 is deformed in a conical fashion 104 to prepare the sheet metal for further eyeleting.

Figure 17:
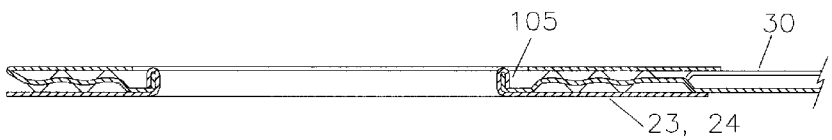

In FIG. 17, the conical depression receives a secondary eyelet 105.

Figure 18:
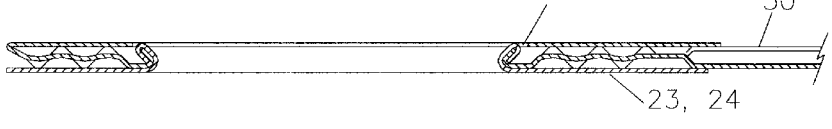

In FIG. 18, the secondary eyelet is flared 106.

Figure 19:

In FIG. 19, the flared secondary eyelet is flattened 107.

A tortuous leak path has thus been formed via the double eyelet suitable for low pressure fuel gas in an internal fuel manifold of a sheet metal fuel cell. The nine step process to join and seal the internal fuel manifold may utilize conventional progressive tooling. By utilizing a thin sheet metal for the main body 30 of the separator plate and subsequently shimming the wet seal areas to the proper relationship with the electrodes it is possible to achieve a very compact double eyeleted seal for the internal manifold. The eyelet bead may be compressed to a thickness below the sum of the material thickness from which it was formed by use of the tooling used to create the final flattened form. Experimentation has demonstrated excellent fuel gas sealing of such a joint at pressures exceeding four inches water column for multiple hundreds of hours operation at 650 degrees centigrade. The eyeleted manifold may additionally be provided with a ring or disc of material to be consumed and encapsulated during the eyeleting process within the eyelet bead to further enhance the sealing properties of the joint. The material may consist, for example, of brazing material or gasketing material. Furthermore, the eyeleted manifold seal bead may also be welded ultrasonically, welded by resistance, welded with laser or welded with electron beam, or other means if desired.

In FIG. 20, a cross-section taken along line E—E of the separator plate 1 shown in FIG. 1 is provided. This view illustrates the preferred method of sealing the ends of the separator adjacent the sides of the separator containing the internal fuel manifolds. The anode end seal area 9 can be seen to have been folded up and over, and includes a shim 110 to ensure the surface of the anode end seal area 9 is flush with the manifold seal area 6. The anode end seal area 9 is supported by the ribs of the ribbed active area 4. Fuel gas flowing through the ribs supporting the anode end seal area 9 would bypass the electrode and escape the fuel cell electrochemical reaction Consequently, a caulking material appropriate for the fuel cell type may be deposited within the ribs supporting the anode end seal area 9 to inhibit the flow of fuel gas through this region of the separator. Furthermore, the sheet metal may be deformed in various manners to inhibit the flow of gasses through the ribs supporting the end seal areas.

It further may be seen from FIG. 20 that cathode end seal area 25 is provided at the opposing face of the separator 1. This component consists of an independent strip of sheet metal and is also supported by the ribs of the ribbed active area 4. The cathode end seal area is further fitted with a shim 111 to ensure the surface of the cathode end seal area 25 is flush with the manifold seal areas 23. Again, as with the anode, oxidant gas flowing through the ribs supporting the cathode end seal area 25 would bypass the electrode and escape the fuel cell electrochemical reaction. A caulking material may be deposited within the ribs supporting the cathode end wet seal area 25 to inhibit the flow of oxidant gas through this region of the separator. Furthermore, the sheet metal may be deformed in various manners to inhibit the flow of gasses through the ribs supporting the end wet seal areas.

FIG. 21 is a cross-section taken along line F—F of the separator plate 1 shown in FIG. 1. This view, taken from within the region of both the end seal area as well as the manifold seal area, reveals that the structure supporting the peripheral seals has changed from the ribbed active area structure to the dimpled manifold area structure. It is seen that the anode end seal area 9 engages the recessed area 51 of the anode fuel outlet manifold seal area 6. Further, it is seen that the shim 110, shown above in FIG. 20, is replaced by the material comprising the recessed area 51. Additionally, it is seen that the cathode end seal area 25, also seen in FIG. 20, has terminated and a transition to the cathode fuel outlet manifold seal area 23 has occurred.

FIG. 22 is a cross-section taken along line G—G of the separator plate shown in FIG. 1. It can be seen that the corner 200 has been folded down and over, and tightly crimped to provide a seal for the corner of the anode gas chamber. The area comprising the crimped corner 200 includes a portion of the overlapping areas 51 and 9, which are held in compression when the separator is installed in a fuel cell stack. As such, an adequate seal for fuel gasses is provided. Additional folds down and over, as well as the insertion of various gasket and/or brazing materials, or welds, may be utilized to further enhance the sealing qualities of the crimped corner.

For clarity, the view of the cross-sectioned dimples shown in FIG. 22 now differs from that provided in FIGS. 7, 8, 9, and 10, because the section line through the dimples is set at a 45 degree angle relative to the direction of manufacture, and bisects the center of the dimples only extending towards the anode face of separator plate 1. The dimples extending towards the cathode face of the separator are seen in the background and are not sectioned.

FIG. 23 is an exploded view of the separator plate 1. The fuel inlet manifold seal area 2 can be seen to have been folded up and over the dimpled structure. The fuel outlet manifold seal area 6 can be seen to be partially folded up and over the dimpled structure. The anode end seal areas 9 are also seen to be partially folded up and over the ribbed active area 4 and the recessed area 51. Upon final assembly into a stack, the anode gas chamber is sealed at the four sides of the separator by the fully folded seals. The overlapping anode end seal 9 and recessed area 51 are under the compression of the axial compressive load applied to the fuel cell stack to provide an adequate seal. Furthermore, additional gasket and/or brazing material may be located between the anode end seal area 9 and recessed area 51 to further enhance the sealing properties of the overlapping areas. An appropriate caulk suitable for use in a fuel cell may be deposited in the seam 112 created by the recess of area 51, shown at FIG. 21, to reduce the discontinuity of the joint.

Following the bending and folding of the anode seals, the four corners are crimped and folded down and over as shown in FIG. 22, thus sealing the anode gas chamber.

The cathode fuel inlet and outlet manifold seal areas 23, 24, as well as the cathode end seal areas 25, are seen in FIG. 23 positioned for installation to the cathode side of the separator plate. Following the bending, folding, and crimping operations associated with sealing the anode gas chamber, the cathode fuel inlet and outlet seal areas are eyeleted to the main body 30 as described above in connection with FIGS. 11–19. The eyeleting tools, are able to access the site of the eyeleting operation through the through holes 35a, 35b, 35c, . . . provided at the anode fuel inlet and anode fuel outlet seal areas. The cathode end seals 25 are installed with an adhesive of the type known to be suitable for the purpose of fuel cell assembly.

Anti-corrosion coatings suitable for the various fuel cell types may be applied to the assembled separator or may be applied to the components of the separator prior to assembly.

A separator plate for a fuel cell amenable to manufacture at high speed and volume and at any desirable length, and assembled and sealed without the requirement to weld the assembly has, therefore, been described herein.

The present invention as described above utilizes one main body bipolar separator plate to produce a plate that contains only a fuel and oxidant flow path for those types of fuel cells that do not require a coolant flow path. The present invention may further utilize two main body bipolar separator plates to produce a plate that contains a fuel, oxidant, and an additional but separate center flow chamber within the assemble fuel cell bipolar plate. The separate flow chamber is situated between the cathode flow chamber and the anode flow chamber and may advantageously be utilized to support additional operations within the fuel cell. For example, the center flow chamber may be utilized as a coolant flow path for liquid or gaseous coolants.

Coolants are used within fuel cell bipolar separator plates to remove the heat generated by the exothermic fuel cell reaction. Fuel cell types operating at low temperature in the range of 100°C. may utilize a liquid coolant. Fuel cell types operating at high temperature in the range substantially above 100°C. may utilize a gaseous coolant.

The center flow chamber may further be advantageously utilized as a housing for an indirect internal steam reformer of the fuel provided to the fuel cell. For example, a steam-reforming catalyst may be positioned within the center flow chamber to affect the steam reforming of the fuel of high temperature fuel cells. As the steam reforming reaction is endothermic, the steam reforming advantageously utilizes the exothermic reaction occurring within the immediately adjacent anode flow chamber. Thus, there is provided the dual purpose of fuel processing of the fuel provided to the fuel cell as well as providing a cooling effect to the fuel cell.

When a center coolant chamber is provided, a second pair of internal manifolds is added to the edge sealing areas. The fuel, oxidant, and coolant flow streams may be assigned to any of the three pairs of manifolds. A preferred embodiment of the present invention provides an internally manifolded fuel, internally manifolded coolant, and externally manifolded oxidant though other combinations are possible.

The tooling is designed such that the tool may be closed to any desirable engagement to produce any desirable depth of the flow ribs, within the elongation constraints of the material being formed. As such, a main body stretch-formed to the maximum extent will nest with a main body stretch-formed less than the maximum extent. The difference in depth of the nested main bodies produces a center-cooling chamber extending along the interior surfaces of the main bodies not in contact. This feature results in a high-surface-area, low-volume, coolant chamber for improved heat transfer properties and improved overall volumetric power density of the cell. The inherently high surface area of the center cooling chamber provides efficient cooling for liquid-cooled fuel cell applications and may permit greater achievable current density. The cross-sectional flow area of the center cooling, anode, and cathode flow chambers may be sized to provide the appropriate flow rate pressure drops.

As will be appreciate by those skilled in the art, the method of forming the main body 30 of the bipolar separator plate is known as stretch forming. As will further be appreciated by those skilled in the art, all known materials possess a limit to the elongation to which they may be subjected. Exceeding the elongation properties of a material results in undesirable rupture and or necking of the material. Therefore, those skilled in the art will know that a maximum depth or height of the bipolar separator plate exists for each material. Further, it can be seen that the depth or height of the bipolar separator plate is, therefore, a function of the material properties of the material being stretch-formed in the tooling and is not a limitation of the tooling. Accordingly, those skilled in the art will further be aware that the patterns stretch-formed into the material by the tooling may be produced to any depth or height up to, but not exceeding, the maximum practical elongation properties of the material.

As will further be appreciated by those skilled in the art, the pattern imposed by the tooling is a fixed pattern, where pitch and spacing of features of the tooling are accurately transferred to the material upon which the pattern is being stretch-formed, provided the elasticity of the material is low.

Therefore, the relative pitch and spacing of features transferred to the material by the tooling remains relatively fixed and accurate regardless of the depth or height of the bipolar separator.

In this manner, a main body stretch-formed to the maximum depth or height without rupture or necking will possess the same relative pitch and spacing of features of a main body stretch-formed to any depth or height less than or equal to the maximum depth or height.

Figure 26:
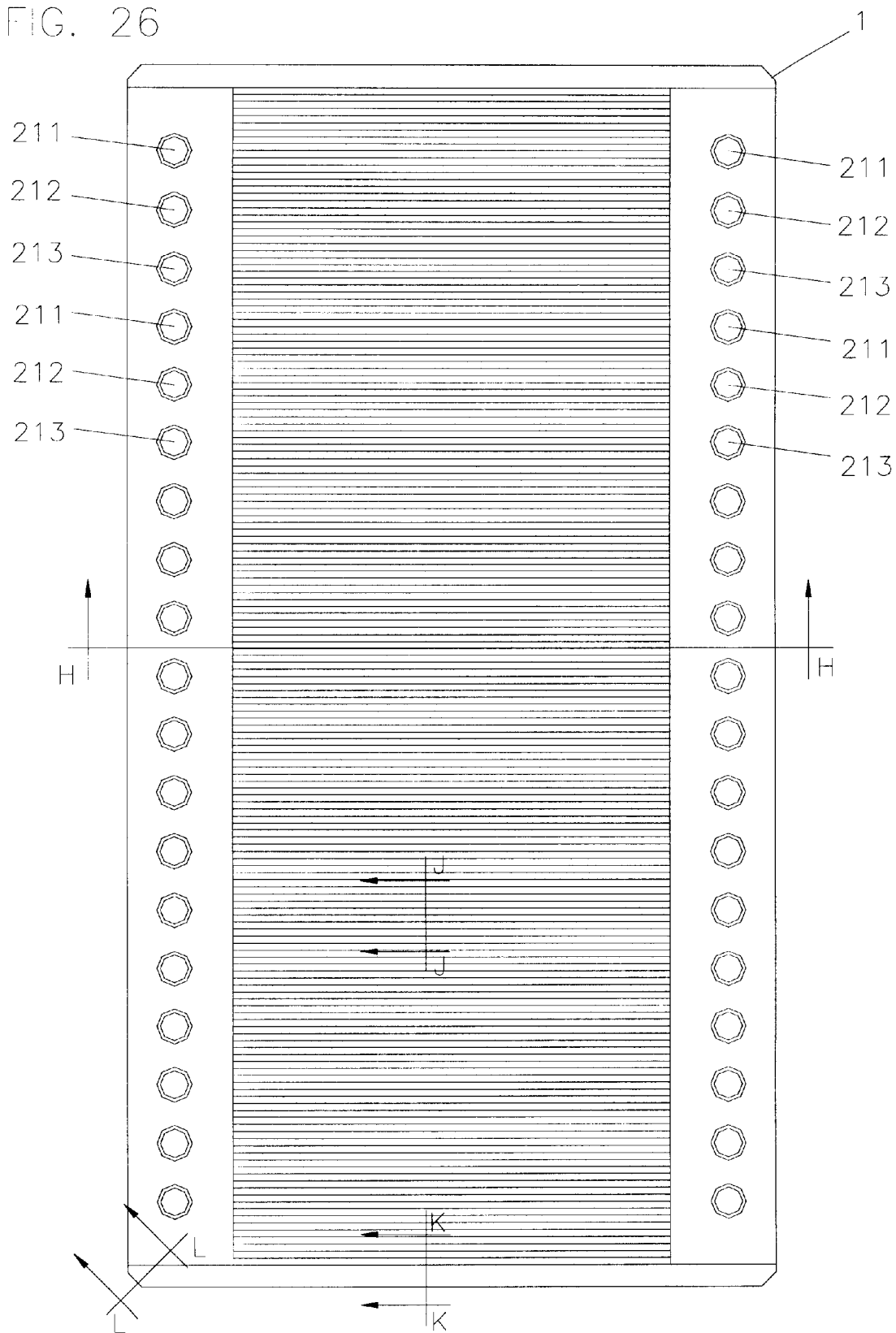
FIG. 26 is a plan view of an assembled separator plate containing a center chamber.

Therefore, the main bodies will accurately nest and engage when married in an intimate interlocking position. This feature is illustrated in FIGS. 24–26, where main body 30A has been stretch-formed to the maximum practical depth and nested with main body 30B that has been stretch-formed to less than the maximum depth to assemble a bipolar separator plate. Center chamber 210 results at all points between the main bodies not in physical contact. FIG. 24 is a cross section taken along line H—H of FIG. 26. FIG. 25 is a cross section taken at line J—J of FIG. 26.

As will be appreciated, a center chamber is created between the main bodies by virtue of the difference in the respective heights and depths of the main bodies. The center chamber exists at all points between the nested main bodies with the exception of the points of contact of the nested main bodies and, therefore, is uniformly distributed across the inner surfaces of the nested main bodies. The center chamber may be advantageously utilized as previously discussed above. The volume and cross-sectional flow areas of the flow chambers of the bipolar separator assembled in this fashion may be advantageously varied or biased to produce volume and cross-sectional flow areas suitable to the stoichiometric requirements of the reactant flow chambers and the cooling chamber.

Fluid communication to the center chamber may be achieved and controlled via a variety of manifolding techniques. The variety of manifolding techniques may be utilized to advantageously provide fluid communication for a variety of liquids and fluids for a variety of purposes.

FIG. 26 illustrates a preferred embodiment where fluid communication to the center chamber 210 may be accomplished via a plurality of coolant manifolds 211 within the peripheral sealing area of the assembled bipolar separator plate. The plurality of coolant manifolds 211 feeding the center chamber of the assembled bipolar separator plate may alternate with a plurality of fuel manifolds 212 feeding the fuel chamber of the assembled bipolar separator plate, and a plurality of oxidant manifolds 213 feeding the oxidant chamber of the assembled bipolar separator plate. Cross-sections of the reactant and coolant manifolds are provided in FIGS. 27–29.

Another preferred embodiment of the manifolding technique is illustrated in cross section in FIG. 31, where fluid communication to the center chamber may be accomplished via an open edge 21 of the assembled bipolar separator plate.Liquids and gasses entering the open edge may access the active area of the bipolar separator by passing between the plurality of through reactant manifolds of the peripheral sealing area as previously discussed. Exit from the center chamber may occur at an opposing open edge, or via a plurality of manifolds located within the peripheral sealing area of the opposing edge. Cross-sections of internal reactant manifolds utilized when the center chamber is manifolded via an open edge are provided in FIGS. 32 and 33.

Another preferred embodiment is illustrated in FIG. 30, where a plurality of manifolds located within the peripheral sealing area may be alternately assigned to the center chamber 210 and either the fuel chamber or the oxidant chamber. That reactant flow stream not assigned manifolds within the peripheral sealing area may be provided with fluid communication to its respective flow chamber via open edge 21.

Furthermore, the direction of flow of fluids or gasses within the center chamber may occur in any one of two directions. The direction of flow for the center chamber may be concurrent with the direction of flow of either one or both of the reactant gasses. Conversely, the direction of flow for the center chamber may be counter-current with the direction of flow of either one or both of the reactant gasses. The direction of flow may be selected to advantageously affect the thermal gradients within an operational stack of assembled fuel cells via the cooling properties of the fluids, gasses, or chemical reactions occurring within the center chamber relative to the exothermic electrochemical reactions occurring within the adjacent reactant flow chambers of the fuel cells comprising the fuel cell stack.

Figure 34:
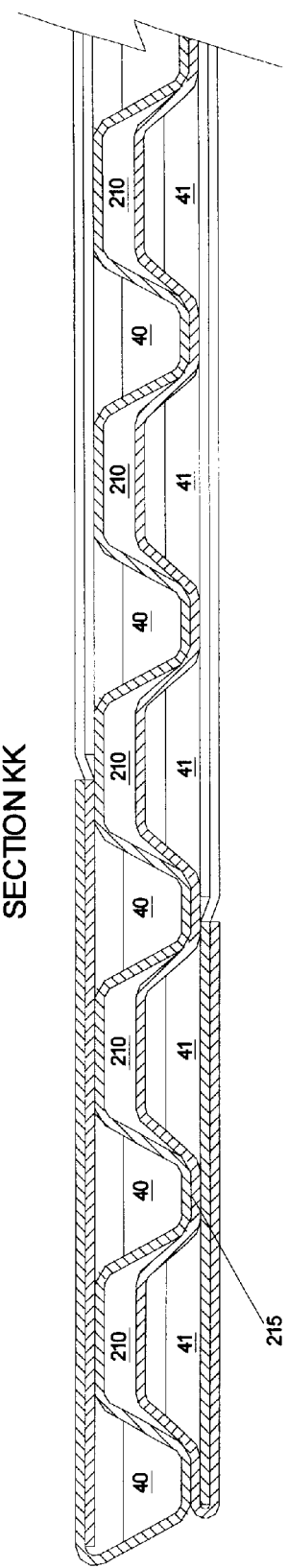
FIG. 34 is a cross-section of the end seal of the separator plate of FIG. 26, taken along line K—K of FIG. 26.

Sealing of the fuel flow channels 40 and the oxidant flow channels 41 of the separator adjacent the sides of the separator containing internal manifolds of the bipolar separator plate constructed with a central cooling chamber may be achieved with a variety of methods. A preferred method of sealing the ends is the method previously discussed and illustrated in FIG. 20 but applied to both main body 30A and main body 30B. FIG. 34, taken along section line K—K of FIG. 26, illustrates this technique in cross-section as it applies to separator plates with a center chamber.

Sealing of the ends of the center chamber 210, within the ribbed active area, adjacent the sides containing the internal manifolds is achieved inherently in the design when the center chamber is externally manifolded via open edges. Substantially parallel ribs of the nested main bodies 30A and 30B of the active area of the separator plate are intimately contacting at the peak and valley of each rib such that lateral fluid flow is impeded. This feature may be seen at 215 of FIG. 34.

Sealing of the ends of the center chamber 210 adjacent the sides containing the internal manifolds when the center chamber is internally manifolded requires a similar approach. FIG. 27 illustrates a cross-section of an internally manifolded center section. It may be seen that main body 30A and main body 30B are nested and provide a center chamber extending through the peripheral sealing area and the ribbed active area. The center chamber is divided from and sealed against the reactant chambers at the swaged and perhaps welded eyelet of the manifold seal, and sealed externally with the application of a sealant 214 deposited between the main bodies 30A and 30B. The sealant 214 may consist of any of the materials known in the art to affect a seal in any of the respective fuel cell types. The sealant 214 may be a thermal setting resin or may consist of a two-part epoxy for low temperature fuel cells. The sealant 214 may be a ceramic-based caulk for high temperature fuel cells. The sealant 214 may be applied during assembly of the main bodies. The sealant 214 may be injected after assembly of the two main bodies.

Figure 35:
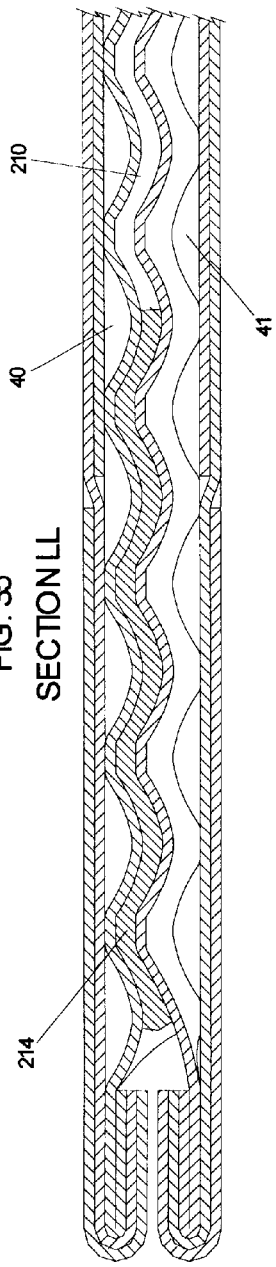
FIG. 35 is a cross-section of the corner seal of the separator plate of FIG. 26, taken along line L—L of FIG. 26.

The corners of the main bodies 30A and 30B are preferably sealed as previously discussed and illustrated in FIG. 22, but applied to both main body 30A and main body 30B. FIG. 35, taken along section line L—L of FIG. 26, illustrates the technique as it applies to separator plates with a center chamber. Sealant 214 is applied as previously discussed to seal center chamber 210 when center chamber 210 is internally manifolded.

Another preferred embodiment for sealing the corners of the main bodies 30A and 30B may include the application of a weld. The weld may be achieved ultrasonically, with laser, with electron beam, with tungsten inert gas (TIG), or any of the various other methods known in the art and as they may apply to the various materials of construction selected for the separator plate.

Figure 36:
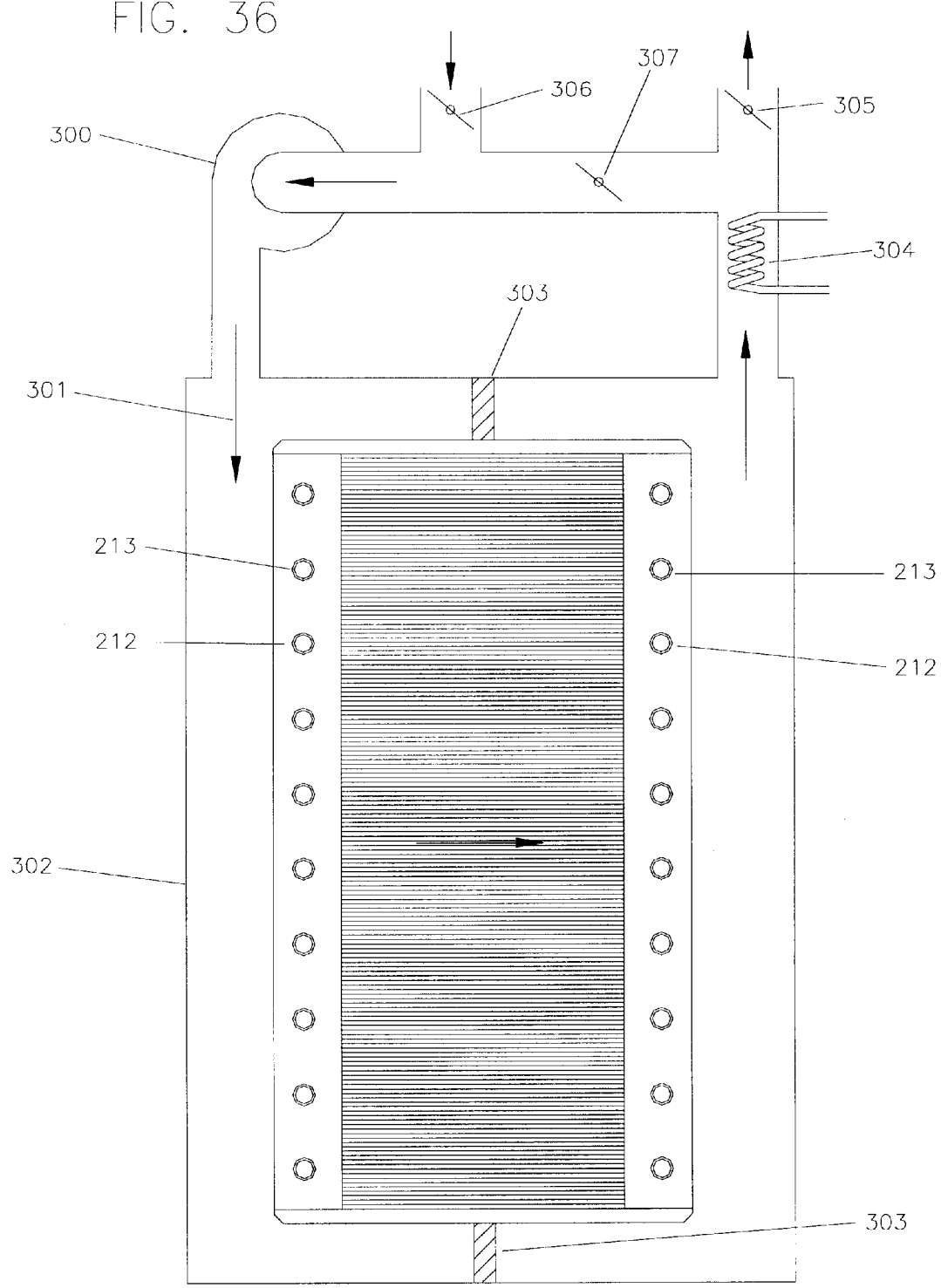
FIG. 36 is a plan view of a housing and seal arrangement for an externally manifolded flow stream of a fuel cell stack using a separator plate of the present invention.

Circuitous coolant flow applied to center chamber 210 via external open edge manifolds is illustrated in plan view in FIG. 36. A pump 300 or blower is seen to provide a motive force to the flow stream 301 through the fuel cell stack. A housing 302 is provided to enclose and direct the flow stream. A seal 303 is provided externally at the ends of the stack to isolate the input side of the fuel cell from the output side of the fuel cell. The flow stream may interact with a heat exchanger 304 to extract heat from the flow stream in a closed loop. Alternatively, a portion of the flow stream may be rejected via valve 305. Make-up flow may be added to the input side of the flow stream via valve 306. System pressure and recirculation may be controlled via valve 307. In this manner, the temperature of the coolant flow stream and the fuel cell stack may be controlled.

External housing 302 may be utilized to contain and control the flow of either the fuel gas stream, the oxidant gas stream, or the coolant stream. External housing 302 may also be utilized to contain and control the flow of a reactant gas stream for fuel cell stacks of bipolar separators that do not employ the center chamber.

The housing and manifold arrangement advantageously minimizes the quantity of seals required to affect the sealing of the reactant gasses. Fuel cell stacks that utilize a liquid electrolyte may suffer from the undesirable migration of the electrolyte from the electrolyte membrane to other areas of the fuel cell. It is well known in the art that molten carbonate electrolyte employed in molten carbonate fuel cells has several mechanisms of migration. One such mechanism involves migration of the electrolyte via the seal of the external manifold housing. Typically, this seal is comprised of a solid dielectric material, as well as a caulk or paste applied to the irregular face of the stack of bipolar separator plates, and a porous gasket. During operation of the fuel cell stack, liquid electrolyte migrates from the electrolyte membrane to the porous gasket and caulk. Voltage present in the fuel cell stack further results in migration of the electrolyte to the anode, or negative pole, of the fuel cell stack. Electrolyte migration over time results in the flooding of cells with electrolyte at the anode, or negative pole, of the stack, and an absence of electrolyte in the cells at the cathode, or positive pole, of the stack. This effect results in premature decay of cells at both poles of the fuel cell stack.

Figure 37:
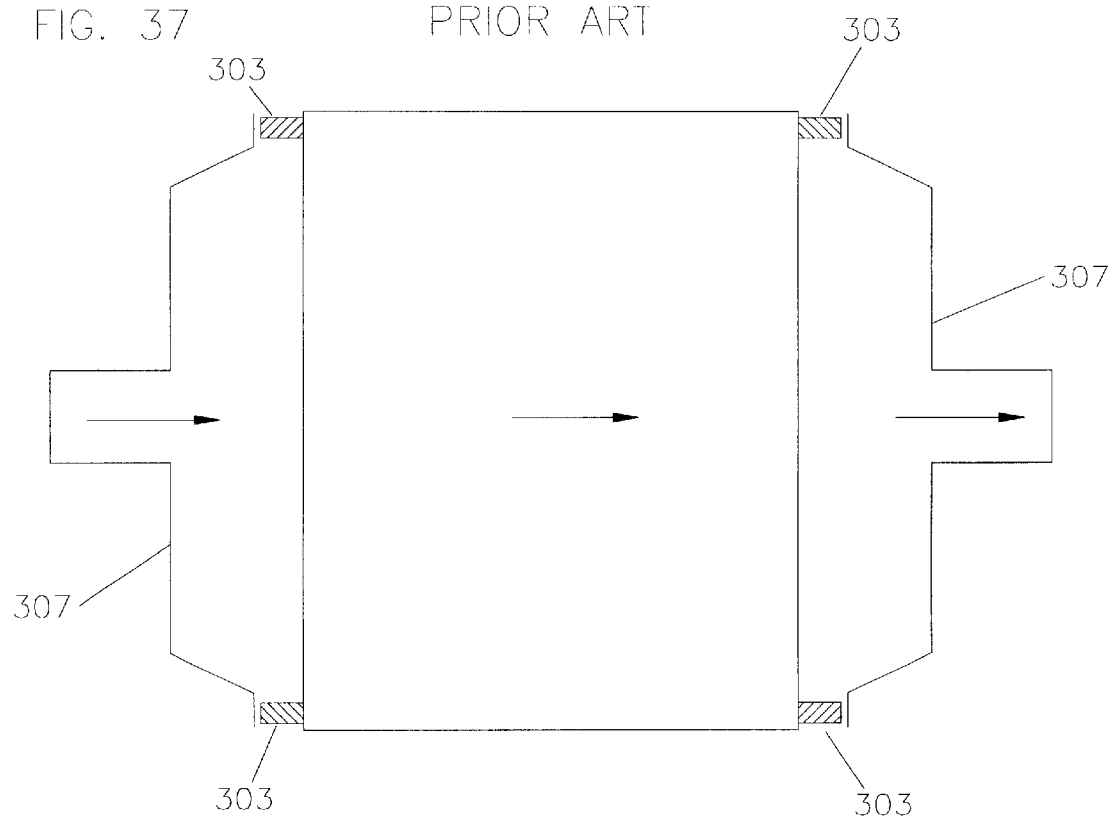
FIG. 37 is a plan view of a prior art housing and seal arrangement for an externally manifolded flow stream of a fuel cell stack.

The arrangement of manifolds advantageously minimizes the quantity of external manifold seals to two and consequently significantly reduces the volume and flow rate of migratory electrolyte for externally manifolded liquid electrolyte fuel cells. FIG. 37 illustrates prior art external manifolding of a single reactant gas stream. It can be seen that four seals 303 are required to achieve a seal of the external manifolds 307.

It further may be appreciated that the manifold and housing arrangement illustrated in FIG. 36 results in the complete enclosure and encapsulation of the four faces of the fuel cell stack. As such, the four faces of the fuel cell stack are maintained in an atmosphere where the composition of the atmosphere is determined by the flow stream assigned to the external manifold. This design may advantageously be utilized for a variety of beneficial effects. For example, it is well established in the art that molten carbonate electrolyte employed in molten carbonate fuel cells will decompose if exposed to atmospheres with low carbon dioxide partial pressure. Observation has revealed that decomposed carbonate electrolyte possesses a higher degree of corrosive properties to the material comprising the bipolar separator plates as well as a higher degree of mobility. The complete encapsulation of the fuel cell stack by the manifold and housing arrangement eliminates the potential for electrolyte decomposition if the reactant assigned to the external manifold is the oxidant reactant, and is partially recirculated for purposes of cooling the fuel cell stack. The composition of recirculated oxidant of a molten carbonate fuel cell includes carbon dioxide. If the reactant assigned to the external manifold is the fuel, the composition of the fuel should include carbon dioxide.

Figure 38:
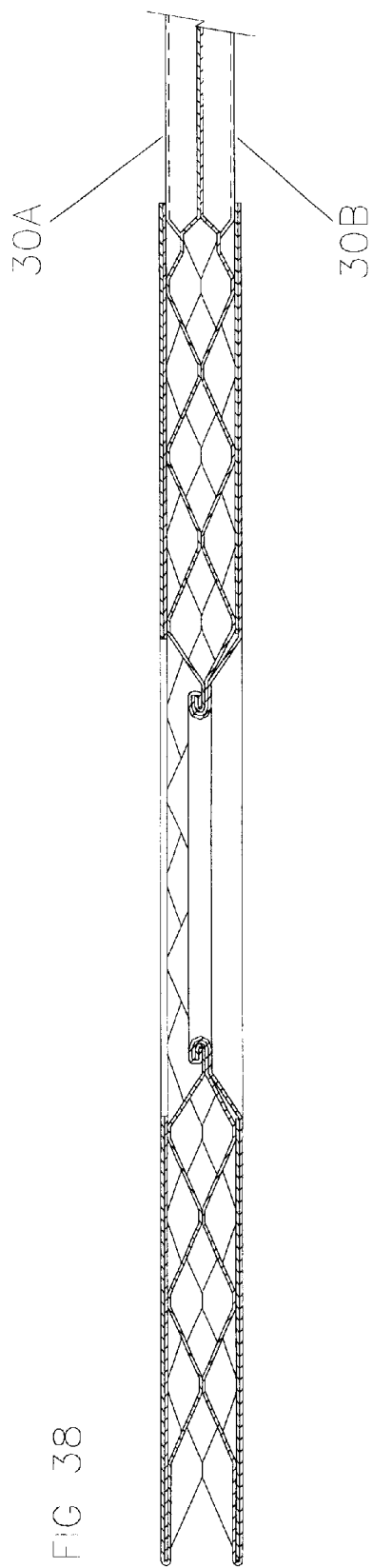
FIG. 38 is a cross-section of an internal fuel manifold of a separator plate containing a center chamber.
Figure 39:
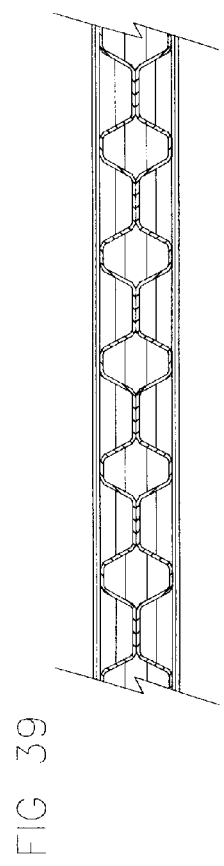
FIG. 39 is a cross-section of the ribbed active area of a separator plate containing a center chamber.

Another preferred embodiment involves the application of two main bodies utilized to form the center chamber without nesting of the patterns formed in the material of the main bodies. FIG. 38 illustrates a cross-section of the internal fuel manifold, and FIG. 39 illustrates a cross section of the ribbed section of a bipolar separator assembled in this manner. As can be seen, the main bodies are not nested, but rather interfere at the contact points to create a center chamber with a volume equal to the sum of the volumes formed between the ribs of the opposing faces of the two main bodies. The main bodies are each produced from the same stretch form tooling as previously described. However, symmetry of the patterns does not exist within the axis of rotation used to position main body 30A over main body 30B. Therefore, the point of contact between the main bodies prohibits nesting of the patterns. It may be seen that the depth or height of either main body may be adjusted and manipulated to create any desirable volume within any of the three chambers formed by the composite structure. This feature may advantageously be utilized to selectively bias the chambers to suit the stoichiometry of the reactant gas flow streams as well as the coolant flow stream. This feature may further be advantageously utilized to maximize the volume and cross-sectional area of the center chamber where the volume of the center chamber is equivalent to the sum of the volumes formed between the ribs of the opposing sides of the main bodies. As such, the volume and cross-sectional area of the center chamber may exceed the volume and cross-sectional flow area of one or both of the reactant gas flow chambers.

A particularly preferred embodiment relating to the method of manufacture of the main bodies involves a method to control the flow of sheet material into the tooling as the repeated sub-section structure is created as the tool closes on the material. As previously described and shown in FIG. 5, a dividing rib 50 is disposed between adjacent sections of the main body 30 of the separator. As previously described, the dividing ribs 50 are an artifact of the progressive tooling in which a pressure pad is employed to grip the sheet metal and prevent draw-in of sheet metal. In a particularly preferred embodiment, the dividing rib 50 is a flow channel. In a further preferred embodiment, the dividing rib is a flow channel that is in fluid communication with the external manifold of the open edges 21 and 22. In a further preferred embodiment, the geometry of the dividing rib 50 is identical to the geometry of the flow ribs of the flow field that is in fluid communication with the externally manifolded flow field. In a further preferred embodiment, the dividing rib 50 is formed ahead of the repeated sub-section prior to the creation of the sub-section bounded by the dividing ribs 50.

Figure 40:
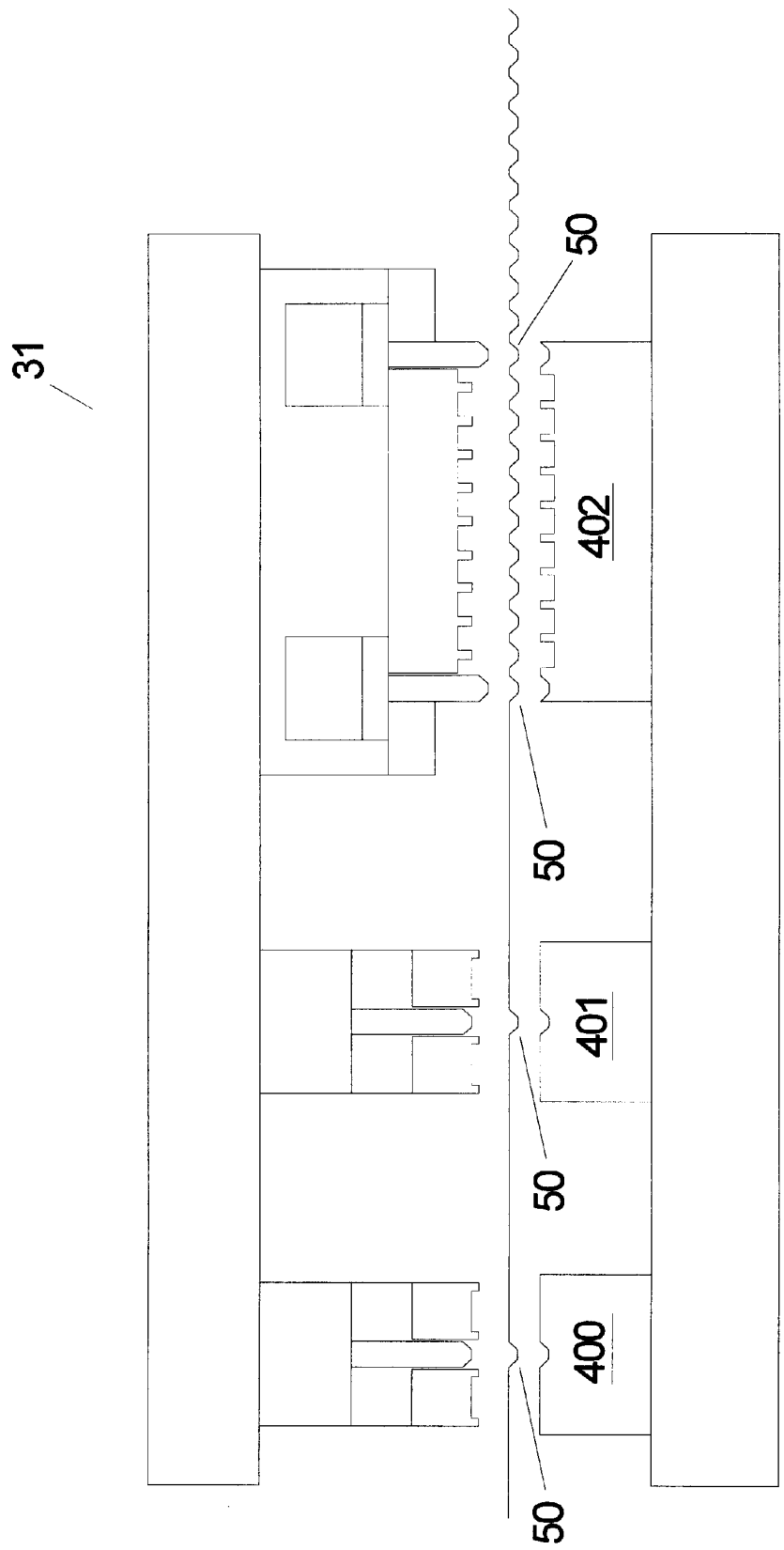
FIG. 40 is an elevation view of tooling used to form the main body of a separator plate.
Figure 41:
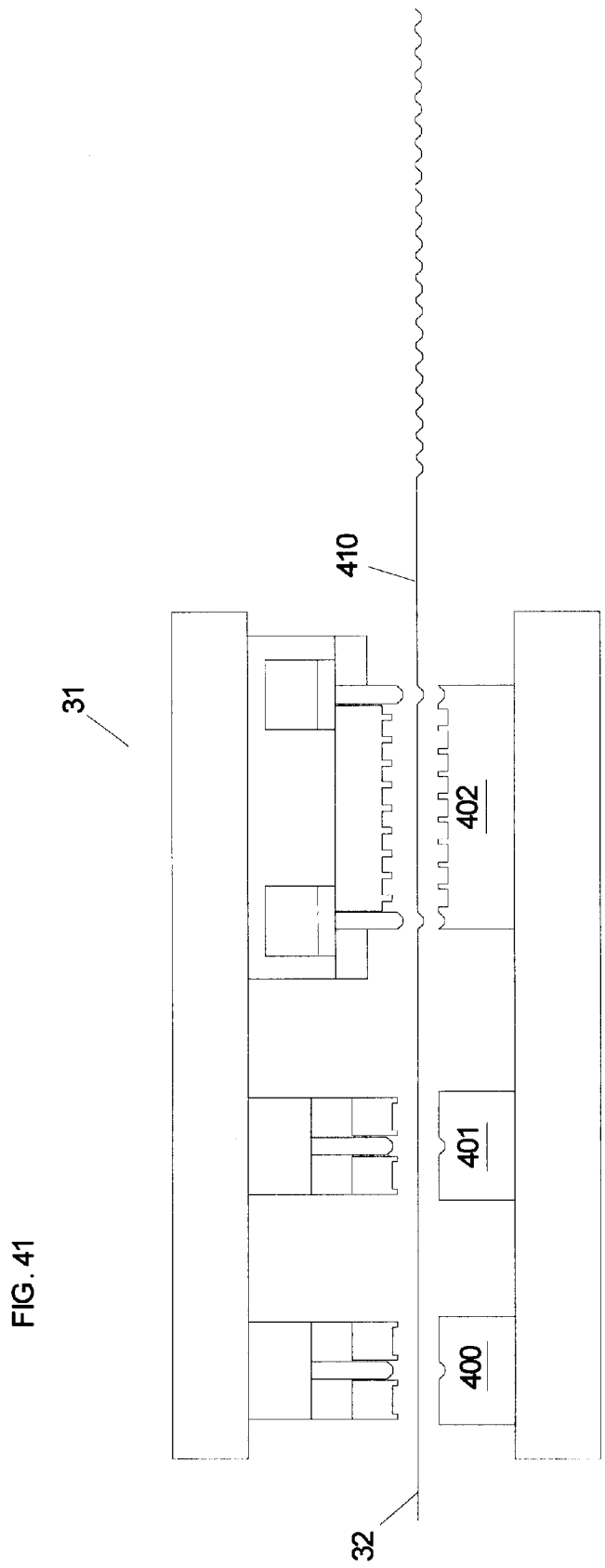
FIG. 41 is an elevation view of tooling used to form a separator plate, and the advancement of the main body of a separator plate through the tooling.

FIG. 40 provides a cross-section view of the sheet metal as it passes through the main body tooling 31. In this view, it is seen that tooling station 400 and tooling station 401 are forming the dividing rib 50 prior to the advancement of the sheet metal into main body tooling station 402. It may be seen in FIG. 41 that, on an open cycle of the tooling 31, the sheet metal 32 may be advanced an intermittent distance equivalent to twice the distance between tooling stations 400, 401, and that upon cycling of tooling 31, an area of sheet metal 410 is created that is free of structure.

Figure 42:
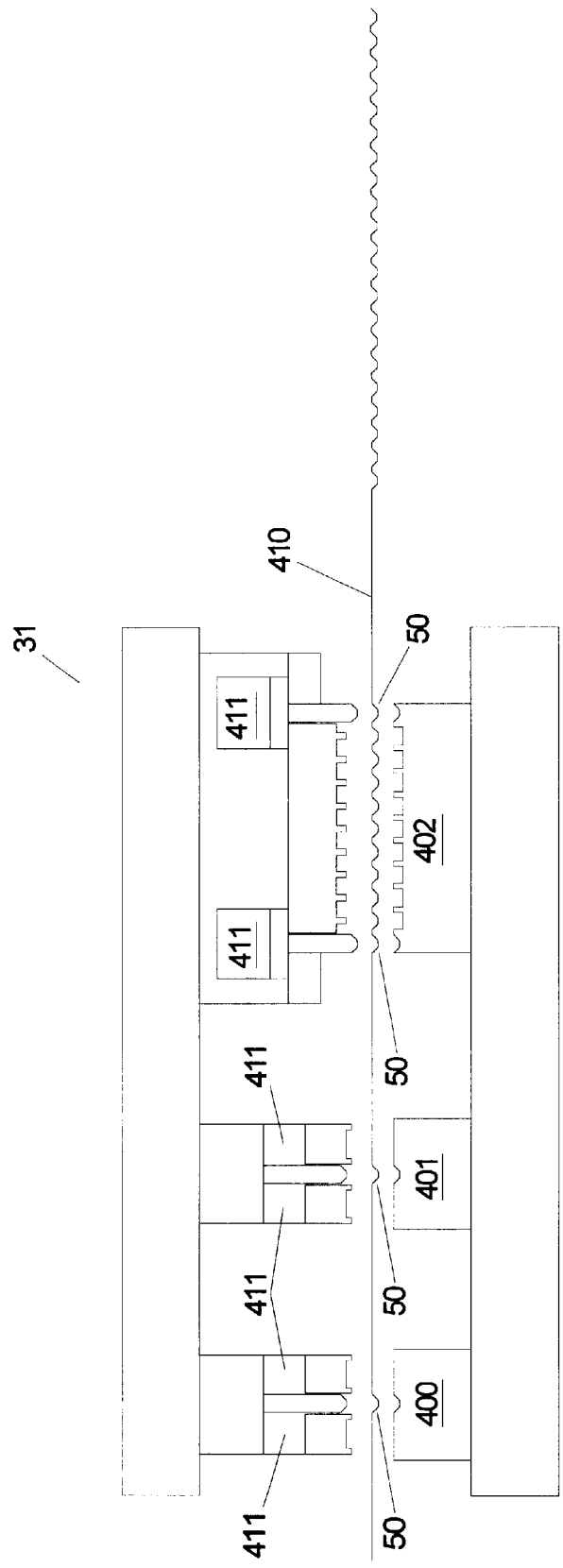
FIG. 42 is an elevation view of tooling used to form a separator plate, showing the creation of an intermittent section free of structure within the main body of the separator plate by the tooling.

FIG. 42 illustrates the creation of the structure-free intermittent section 410, and shows dividing ribs 50 pre-formed to permit continued cycling of the tooling 31 in order to produce the repeated segment in continuous mode with control of draw-in of sheet metal within the foot print of the main tooling section. Springs or spring material 411 are provided in tooling stations 400, 401, 402 to provide clamping pressure on sheet metal 32.

Fuel cells may be operated at ambient and elevated pressure. Pressurized fuel cell systems provide greater power capacity but at the expense of added capital cost and complexity. Additional problems can occur as well. For example, in an MCFC system, pressurization can cause increased cathode corrosion, soot formation, seal leakage, and decreased methane reforming. Near-atmospheric-pressure operation above the delivery pressure of pipeline natural gas may alleviate these issues to a degree but still require high-pressure blowers for the oxidant and natural gas boosters for the fuel. Operation of the fuel cell at ambient pressure is the simplest in terms of balance-of-plant equipment, fuel cell life, and health and human safety for small-scale fuel cell power plants. Pipeline natural gas is generally supplied in the range of 0.25 –2.0 PSI. Systems designed to operate the anode portion of the fuel cell system at or below this pressure benefit accordingly.

However, ambient pressure operation presents pressure-drop constraints on the reactant flow streams. These pressure-drop constraints dictate large cross-sectional flow area for the reactants. In this scenario, the flow channels of the central active area are optimized for reactant flow at low pressure-drop. Therefore, the wide and deep flow channels may not provide an adequate distribution of mechanical support for the electrodes and electrolyte membrane. To this end, a current collector/electrode support is added to the design of the bipolar separator plate. Specifically, a plurality of parallel flat wires is continuously slit from coiled material. The flat wire current collector may be bonded to a phantom substrate, directly to the diffusion electrode prior to assembly, or directly the flow channels of the bipolar separator plate.

Figure 43:
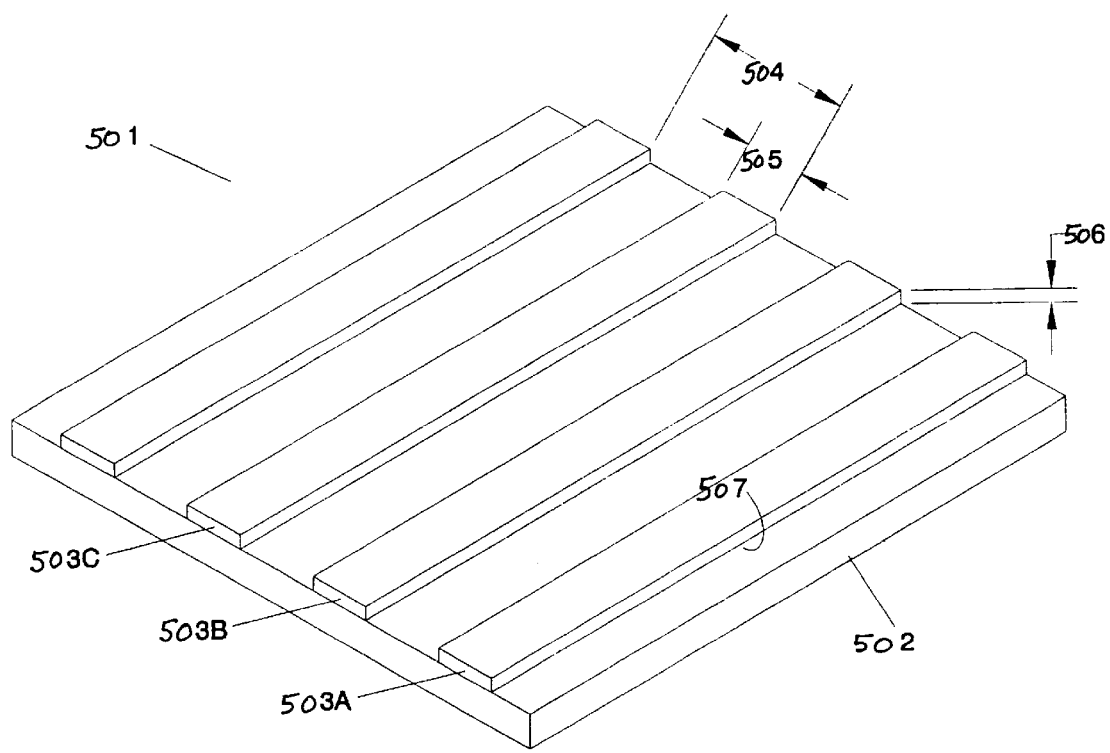
FIG. 43 is a perspective view of another embodiment of the present invention, showing the use of flat wires in conjunction with an electrode.

As seen in FIG. 43, a current collector/electrode sub-assembly 501 using flat wires is shown. As illustrated, sub-assembly 501 includes an electrode 502 and a plurality of flat wires 503A, 503B 503C, ... which extend across the surface of electrode 502. The flat wires 503A, 503B, 503C, ... are set at a pitch 504, possess a width 505, and possess a thickness 506. An adhesive 507 is applied to one surface of flat wires 503A, 503B, 503C ... for the purpose of bonding to the electrode 502. Further description of the use of such flat wires is provided in commonly owned U.S. Pat. No. 6,383,677, entitled "Fuel Cell Current Collector", issued on May 7, 2002, and which is incorporated in its entirety herein by reference.

The current collector advantageously permits lateral flow between adjacent flow channels for uniformity of pressure and composition of reactants. The flat wire current collector is economical to produce without generation of scrap and provides up to 50% open area for gas access to electrodes. The flat wires are finely distributed with a width and spacing less than 1.0 mm. This fine distribution provides excellent support to the electrodes and electrolyte membranes over already finely distributed flow channels of the active area.

The design of the bipolar separator plate may be applied to pressurized systems if desired. In this scenario the cross-sectional flow area of the flow channels may be significantly reduced resulting in the flow ribs and channels reduced in size and pitch. As such, the flat wire current collector is most likely not required because the flow ribs will provide adequate support to the electrodes and electrolytes.

Proper material selection accompanied with protective thermoplastic polymer coatings applied to the bulk coil in-process encapsulates the bipolar separator plate and current collector and addresses the issue of corrosion and cation contamination of the membrane and dielectric coolant when metallic bipolar separators and current collectors are applied to PEMFC's. The thermoplastic polymer coating further aids assembly. Other coating technologies are available as well.

The design of the present invention has been tested with MCFC active components using a single main body bipolar separator plate without the center-cooling chamber. The test results indicate that the architecture and geometry of the design is suitable for fuel cell applications. TABLE 1 provides test results:

| SUMMARY OF TESTING ACTIVITY AT ALLEN ENGINEERING | | | | | |
|---|---|---|---|---|---|
| TEST ID NUMBER | CELL AREA (NOMINAL CM2) | CELL QTY. | PERFORMANCE (mV DC @ DESIGN POINT) | RESISTANCE (mOhm cm2) | DURATION (HOT HOURS) |
| 50-5-1 | 100 | 5 | 0.730 | 275 | 600 |

STANDARD CONDITIONS: FUEL(DRY) 80/20 H2CO2; OXIDANT (DRY) 12.6/18.4/69.0 O2/CO2/N2
75% FUEL UTIL.; 50% OXIDANT UTIL.; 140 mA/CM2

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

I claim:

1. A repeatable segment of a fuel cell bipolar separator plate comprising, in combination:
   a plate having a first surface and an opposing second surface;
   a plurality of ribs on the plate defining flow channels along the first surface and the second surface of the plate;
   a seal area extending along each of opposed side edges of the plate, the seal areas being formed by folding over edge portions of the plate onto one of the first surface and the second surface of the plate and including mating pairs of apertures configured to line up with one another when the edge portions are folded over, the seal areas and mating apertures forming internal inlet and outlet manifolds in fluid communication with the flow channels of one of the first surface and the second surface; and
   a seal member secured along each seal area on the other of the first surface and the second surface of the plate to define external inlet and outlet manifolds along side edges of the plate in fluid communication with the flow channels of the other of the first surface and the second surface.

2. The repeatable segment of claim 1, wherein the seal members include apertures configured to line up with corresponding apertures of the seal areas, the apertures of the seal members being eyeleted to the corresponding apertures of the seal areas.

3. The repeatable segment of claim 2, wherein the apertures of the seal members are double eyeleted to the corresponding apertures of the seal areas.

4. The repeatable segment of claim 2, wherein the eyeleted apertures further comprise a sealant.

5. The repeatable segment of claim 1, further comprising a pair of shims, each shim positioned between a seal member and the other of the first surface and the second surface of the plate.

6. The repeatable segment of claim 1, wherein at least some of the internal inlet and outlet manifolds comprise fuel inlet and fuel outlet manifolds.

7. The repeatable segment of claim 1, wherein at least some of the internal inlet and outlet manifolds comprise oxidant inlet and oxidant outlet manifolds.

8. The repeatable segment of claim 1, wherein at least some of the external inlet and outlet manifolds comprise fuel inlet and fuel outlet manifolds.

9. The repeatable segment of claim 1, wherein at least some of the external inlet and outlet manifolds comprise oxidant inlet and oxidant outlet manifolds.

10. The repeatable segment of claim 1, wherein cross-sectional areas of the flow channels on the first surface are one of larger than and smaller than cross-sectional areas of the flow channels on the second surface.

11. The repeatable segment of claim 1, wherein the seal areas include a plurality of dimples extending outwardly from the first surface of the plate and a plurality of dimples extending outwardly from the second surface of the plate.

12. The repeatable segment of claim 1, wherein the flow channels on the first and second surfaces extend substantially perpendicular to a direction of manufacture of the repeatable segment.

13. The repeatable segment of claim 1, wherein a portion of each end of the plate is folded over onto one of the first surface and the second surface of the plate to form first end seals.

14. The repeatable segment of claim 13, further comprising end seal members, the end seal members being secured to the other of the first surface and the second surface of the plate to form second end seals.

15. The repeatable segment of claim 1, further comprising an additional plate having a first surface and an opposing second surface, and a plurality of ribs defining flow channels along the second surface of the additional plate, the ribs of the plate having a height that is different than a height of the ribs of the additional plate, the first surface of the additional plate abutting the second surface of the plate such that the ribs of the additional plate are nested within the ribs of the plate to form center flow channels between the plate and the additional plate.

16. The repeatable segment of claim 15, wherein the center flow channels are coolant flow channels.

17. The repeatable segment of claim 15, wherein the center flow channels house a reformer.

18. The repeatable segment of claim 15, wherein a portion of each of the opposed ends of the plate are folded over onto the second surface of the additional plate to form opposed first end seals.

19. The repeatable segment of claim 15, further comprising a pair of end seal members, each end seal member being secured to the first surface of the plate at a respective end of the plate to form opposed second end seals.

20. The repeatable segment of claim 19, further comprising a pair of shims, each shim positioned between an end seal member and the first surface of the plate.

21. The repeatable segment of claim 15, wherein edge portions of the additional plate are folded over onto one of the second surface of the additional plate and the first surface of the plate.

22. The repeatable segment of claim 15, wherein edge portions of the plate and the additional plate are folded over onto the second surface of the additional plate.

23. The repeatable segment of claim 15, wherein edge portions of the additional plate are folded over onto the second surface of the additional plate and edge portions of the plate are folded over onto the first surface of the plate.

24. The repeatable segment of claim 23, wherein a sealant is applied to edge portions of the sheet between the plate and the additional plate.

25. The repeatable segment of claim 1, further comprising a pair of dividing sections, each dividing section being positioned between a corresponding seal area and the flow channels.

26. The repeatable segment of claim 25, wherein a plane of the dividing sections is closer to a plane of one of the first and second surfaces of the plate than it is to the plane of the other of the first and second surfaces of the plate.

27. The repeatable segment of claim 1, further comprising an additional plate having a first surface and an opposing second surface, and a plurality of ribs defining flow channels along the second surface of the additional plate, the first surface of the additional plate abutting the second surface of the plate such that the ribs of the additional plate are aligned with the ribs of the plate to form center flow channels between the plate and the additional plate.

28. The repeatable segment of claim 1, wherein corners of the plate are folded over and crimped to provide a seal.

29. The repeatable segment of claim 1, further comprising a plurality of flat wires spaced apart from one another and secured to one of the first surface and the second surface of the plate.

30. A fuel cell bipolar separator plate comprising, in combination:
a plate having a first surface and an opposing second surface;
a plurality of ribs on the plate defining flow channels along the first surface and the second surface of the plate;
a seal area extending along each of opposed side edges of the plate, the seal areas being formed by folding over edge portions of the plate onto one of the first surface and the second surface of the plate and including mating pairs of apertures configured to line up with one another when the edge portions are folded over, the seal areas and mating apertures forming internal inlet and outlet manifolds in fluid communication with the flow channels of one of the first surface and the second surface; and
a seal member secured along each seal area on the other of the first surface and the second surface of the plate to define external inlet and outlet manifolds along side edges of the plate in fluid communication with the flow channels of the other of the first surface and the second surface.

31. The separator plate of claim 30, wherein the plate comprises at least one repeatable segment, each repeatable segment including an internal inlet manifold in one seal area and an internal outlet manifold in an opposing seal area.

32. The separator plate of claim 31, wherein each repeatable segment is separated from adjacent repeatable segments by dividing ribs.

33. The separator plate of claim 32, wherein the dividing ribs comprise fluid flow channels.

34. The separator plate of claim 31, wherein each repeatable segment includes an external inlet manifold in one seal area and an external outlet manifold in an opposing seal area.

35. The separator plate of claim 34, wherein each repeatable segment is separated from adjacent repeatable segments by dividing ribs that comprise fluid flow channels, the fluid flow channels extending beyond the flow channels on the first and second surfaces and into the opposing seal areas of the plate such that they are in fluid communication with the external manifolds.

36. The separator plate of claim 30, further comprising a pair of shims, each shim positioned between a seal member and the other of the first surface and the second surface of the plate.

37. The separator plate of claim 30, wherein the seal members include apertures configured to line up with corresponding apertures of the seal areas, the apertures of the seal members being eyeleted to the corresponding apertures of the seal areas.

38. The separator plate of claim 30, wherein the plate comprises a plurality of segments positioned between first and second end segments.

39. The separator plate of claim 30, wherein a portion of each end of the plate is folded over onto one of the first and second surfaces of the plate to form opposed first end seals.

40. The separator plate of claim 39, further comprising a pair of end seal members, each end seal member being secured to the other of the first and second surfaces of the plate at a respective end of the plate to form opposed second end seals.

41. The separator plate of claim 40, further comprising a pair of shims, each shim positioned between an end seal member and the other of the first and second surfaces of the plate.

42. The separator plate of claim 30, wherein corners of the plate are folded over and crimped to provide a seal.

43. The separator plate of claim 30, further comprising a plurality of flat wires spaced apart from one another and secured to one of the first surface and the second surface of the plate.

44. A bipolar separator plate comprising, in combination:
a first sheet of metal having a plurality of ribs in a central area thereof, the ribs forming flow channels on a first surface of the first sheet;
a second sheet of metal having a plurality of ribs in a central area thereof, the ribs of the second sheet having a depth shallower than a depth of the ribs of the first sheet and forming flow channels on a second surface of the first sheet, a first surface of the second sheet abutting a second surface of the first sheet such that the ribs of the second sheet are nested within the ribs of the first sheet to form center flow channels between the first and second sheets;
opposing edge seal areas of the first and second sheets having mating pairs of apertures and being folded over themselves onto one of the first surface of the first sheet and the second surface of the second sheet, such that the apertures of each pair of apertures are aligned with one another and the folded over seal areas form opposing internal inlet and outlet manifolds; and
a pair of strips of sheet metal, each strip being attached to the first sheet at an intersection of a seal area and the flow channels on the first surface of the first sheet and having a plurality of apertures that align with corresponding apertures of the first and second sheets, the strips forming external inlet and outlet manifolds at open edges of the bipolar plate.

45. The separator plate of claim 44, wherein the plate is composed of repeated segments.

46. The separator plate of claim 44, wherein at least some apertures of the first and second sheets and the strips of metal are eyeleted together such that an internal inlet manifold and an internal outlet manifold in opposing seal areas are in fluid communication with flow channels on the first surface of the first sheet.

47. The separator plate of claim 44, wherein at least some apertures of the first and second sheets and the strips of metal are eyeleted together such that an internal inlet manifold and an internal outlet manifold in opposing seal areas are in fluid communication with flow channels on the second surface of the second sheet.

48. The separator plate of claim 44, wherein at least some apertures of the first and second sheets and the strips of metal are eyeleted together such that an internal inlet manifold and an internal outlet manifold in opposing seal areas are in fluid communication with the center flow channels.

49. The separator plate of claim 44, wherein the external inlet and outlet manifolds are in fluid communication with the center flow channels.

50. The separator plate of claim 44, wherein at least some of the internal inlet and outlet manifolds comprise fuel inlet and fuel outlet manifolds.

51. The separator plate of claim 44, wherein at least some of the internal inlet and outlet manifolds comprise oxidant inlet and oxidant outlet manifolds.

52. The separator plate of claim 44, wherein at least some of the external inlet and outlet manifolds comprise fuel inlet and fuel outlet manifolds.

53. The separator plate of claim 44, wherein at least some of the external inlet and outlet manifolds comprise oxidant inlet and oxidant outlet manifolds.

54. The separator plate of claim wherein edge portions of the first sheet and the second sheet are folded over onto the second surface of the second sheet.

55. The separator plate of claim 44, wherein edge portions of the second sheet are folded over onto the second surface of the second sheet and edge portions of the first sheet are folded over onto the first surface of the first sheet.

56. The separator plate of claim 44, wherein a sealant is applied between the first sheet and the second sheet along edges thereof.

57. The separator plate of claim 44, wherein cross-sectional areas of the flow channels on the first surface of the first sheet are one of larger than and smaller than cross-sectional areas of the flow channels on the second surface of the second sheet.

58. The separator plate of claim 44, wherein the seal areas include a plurality of dimples extending outwardly from the surfaces of the first and second sheet.

59. The separator plate of claim 44, wherein the separator plate is divided into segments, each segment including at least one internal inlet manifold in one seal area and at least one internal outlet manifold in the opposing seal area.

60. The separator plate of claim 59, wherein each segment is separated from adjacent segments by dividing ribs.

61. The separator plate of claim 60, wherein the dividing ribs comprise fluid flow channels.

62. The separator plate of claim 59, wherein each segment includes an external inlet manifold in one seal area and an external outlet manifold in the opposing seal area.

63. The separator plate of claim 59, wherein each segment is separated from adjacent segments by dividing ribs that comprise fluid flow channels, the fluid flow channels extending beyond the flow channels on the first and second surfaces and into the opposing seal areas of the plate such that they are in fluid communication with the external manifolds.

64. The separator plate of claim 44, wherein the flow channels on the first surface of the first sheet and the second surface of the second sheet extend substantially perpendicular to a direction of manufacture of the separator plate.

65. The separator plate of claim 44, wherein the first plate has a thickness sufficient to withstand a compressive force applied to a fuel cell stack comprising a plurality of nested first and second sheets.

66. The separator plate of claim 44, wherein the second sheet has a thickness sufficient to withstand a differential gas pressure between the flow channels on the second surface of the second sheet and the center flow channels, and insufficient to withstand a compressive force applied to a fuel cell stack comprising a plurality of nested first and second sheets.

67. The separator plate of claim 44, wherein the center flow channels are coolant flow channels.

68. The separator plate of claim 44, wherein the center flow channels house a reformer.

69. The separator plate of claim 44, wherein a portion of each of the opposed ends of the first and second sheets are folded over onto the second surface of the second sheet to form opposed first end seals.

70. The separator plate of claim 44, further comprising a pair of end seal members, each end seal member being secured to the first surface of the first sheet at a respective end of the first sheet to form opposed second end seals.

71. The separator plate of claim 44, wherein the first and second sheets each further comprise a pair of dividing sections, each dividing section being positioned between a corresponding seal area and the flow channels.

72. The separator plate of claim 44, wherein a plane of each dividing section is closer to a plane of one of the first and second sheets than it is to the plane of the other of the first and second sheets.

73. The separator plate of claim 44, wherein corners of the first and second sheets of metal are folded over and crimped to provide a seal.

74. The separator plate of claim 44, further comprising a plurality of flat wires spaced apart from one another and secured to one of the first surface of the first sheet of metal and the second surface of the second sheet of metal.

75. A fuel cell assembly comprising, in combination:
   a housing;
   a fuel cell stack disposed in the housing, the fuel cell stack comprising
      a first sheet of metal having a plurality of ribs in a central area thereof, the ribs having a first depth and forming flow channels on a first surface of the first sheet;
      a second sheet of metal having a plurality of ribs in a central area thereof, the ribs of the second sheet having a second depth shallower than the first depth and forming flow channels on a second surface of the first sheet, a first surface of the second sheet abutting a second surface of the first sheet such that the ribs of the first and second sheets are nested with one another to form center flow channels between the first and second sheets;
      opposing edge seal areas of the first and second sheets having mating pairs of apertures and being folded over themselves onto one of the first surface of the first sheet and the second surface of the second sheet, such that the apertures of each pair of apertures are aligned with one another and the folded over seal areas form opposing internal inlet and outlet manifolds; and
      a pair of strips of sheet metal, each strip being attached to the first sheet at an intersection of a seal area and the flow channels on the first surface of the first sheet and having a plurality of apertures that align with corresponding apertures of the first and second sheets, the strips forming external inlet and outlet manifolds at open edges of the bipolar plate; and
   a pair of seals, each seal positioned between the fuel cell stack and the housing.

76. A fuel cell bipolar separator plate comprising, in combination:
   a first plate having a first surface and an opposing second surface;
   a plurality of ribs on the first plate defining a fuel flow path along the first surface of the first plate;
   a second plate having a first surface and an opposing second surface;
   a plurality of ribs on the second plate defining an oxidant flow path along the second surface of the second plate;
   wherein the ribs on one of the first and second plates have a height different than the ribs on the other plate, and peaks of the ribs on one side of one of the first and second plates are in abutting relationship with corresponding peaks of the ribs on one side of the other of the first and second plates to define a coolant flow path between the first and second plates.

77. The separator plate of claim 76, wherein the fuel flow path, oxidant flow path, and coolant flow path are substantially parallel to one another.

78. The separator plate of claim 76, wherein the fuel flow path, oxidant flow path, and coolant flow path are substantially perpendicular to a direction of manufacture of the first and second plate.

79. The separator plate of claim 76, further comprising seal areas along each side edges of the first plate.

80. The separator plate of claim 79, wherein the seal areas are formed by folding over a portion of the first plate onto itself.

81. The separator plate of claim 80, wherein the seal areas include a plurality of dimples defining a fluid flow path within the folded over portions of the plate.

82. The separator plate of claim 80, wherein the first and second plates include a plurality of segments, each segment including at least one fuel inlet in one seal area and at least one corresponding fuel outlet in the opposing seal area of that segment, the inlet and outlet communicating with one another through the fuel flow path of that segment.

83. The separator plate of claim 82, wherein each fuel inlet and fuel outlet comprises a mating pair of apertures formed in the seal areas such that the mating pair of apertures line up with one another when the first plate is folded over onto itself.

84. The separator plate of claim 80, wherein the first and second plates include a plurality of segments, each segment including an oxidant inlet in one seal area and a corresponding oxidant outlet in the opposing seal area of that segment, the oxidant inlet and outlet communicating with one another through the oxidant flow path of that segment.

85. The separator plate of claim 84, further comprising an oxidant seal member secured along each edge of the plate to define the oxidant inlet and oxidant outlet 86. The separator plate of claim 85, wherein the seal areas include a plurality of dimples defining a fluid flow path between the seal members and the plate.

87. The separator plate of claim 76, wherein a central portion of each end of each plate is folded over onto itself to form a seal along the respective end of each plate.

88. The separator plate of claim 87, further comprising recesses formed along sides of each end of each plate outward of the central portions and shaped to receive the central portions when the central portions are folded over.

89. The separator plate of claim 80, wherein each segment further includes at least one coolant inlet in one seal area and at least one corresponding coolant outlet in the opposing seal area of that segment, the coolant inlet and coolant outlet communicating with one another through the coolant flow path of that segment.

90. The separator plate of claim 89, wherein each coolant inlet and coolant outlet comprises a mating pair of apertures formed in the seal areas such that the mating pair of apertures line up with one another when the first plate is folded over onto itself.

91. The separator plate of claim 76, wherein the ribs of the first and second plate are of a height sufficient to withstand a compressive force applied to a fuel cell stack comprising a plurality of first and second plates.

* * * * *